US012709302B2

(12) United States Patent
Chen et al.

(10) Patent No.: US 12,709,302 B2
(45) Date of Patent: Aug. 18, 2026

(54) MOTION PLANNING

(71) Applicant: NVIDIA Corporation, Santa Clara, CA (US)

(72) Inventors: Yuxiao Chen, Newark, CA (US); Sushant Veer, Sunnyvale, CA (US); Peter Karkus, Zurich (CH); Marco Pavone, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 248 days.

(21) Appl. No.: 18/366,202

(22) Filed: Aug. 7, 2023

(65) Prior Publication Data

US 2025/0058802 A1 Feb. 20, 2025

(51) Int. Cl.
*B60W 60/00* (2020.01)

(52) U.S. Cl.
CPC ... *B60W 60/0027* (2020.02); *B60W 2554/404* (2020.02); *B60W 2554/4046* (2020.02); *B60W 2554/802* (2020.02)

(58) Field of Classification Search
CPC ... B60W 60/00276; B60W 2554/4046; B60W 2554/802; B60W 60/0011; B60W 60/0027; B60W 2554/404
USPC ........................................................ 701/26
See application file for complete search history.

(56) References Cited

U.S. PATENT DOCUMENTS

2019/0243371 A1 8/2019 Nister et al.
2019/0258251 A1 8/2019 Ditty et al.
2019/0384304 A1 12/2019 Towal et al.
2020/0159225 A1* 5/2020 Zeng .................... G05D 1/0088
2020/0249674 A1 8/2020 Dally et al.
2021/0149404 A1* 5/2021 Zeng ........................ G01S 17/89
2021/0213978 A1* 7/2021 Edling ............ B60W 60/00276
2021/0253128 A1 8/2021 Nister et al.
2022/0032960 A1* 2/2022 Wang ................... G05D 1/0088
2022/0176995 A1* 6/2022 Subramanian ........ B60W 30/08
2022/0219726 A1* 7/2022 Yadmellat .......... B60W 60/0011
(Continued)

FOREIGN PATENT DOCUMENTS

KR 20210003752 A * 1/2021 ............ B60W 30/09

OTHER PUBLICATIONS

Campana et al., "A gradient-based path optimization method for motion planning", 2016, Hal Open Science (Year: 2016).*
(Continued)

*Primary Examiner* — Gertrude Arthur Jeanglaude
(74) *Attorney, Agent, or Firm* — IRON SUMMIT IP LLP

(57) ABSTRACT

In various examples, a gradient-based motion planner evaluates a cost function corresponding to routes for a machine and an obstacle to jointly update the routes. The cost function may include terms to penalize deviation from an initial route predicted for the obstacle and acceleration or jerk for the obstacle. The routes for the machine and the obstacle that are updated may be selected using motion classes that characterize relative motion between a route for the machine and a route for the obstacle. A motion class may be based at least on an angular distance between the machine and the agent and free-end homotopy, where members of the class execute the same relative motion with respect to other agents while being continuously transformable to any other member of the class. The members of the class may have the same start point and different end points.

20 Claims, 14 Drawing Sheets

(56) References Cited

U.S. PATENT DOCUMENTS

| | | | | |
|---|---|---|---|---|
| 2022/0355822 | A1* | 11/2022 | Molinari | B60W 60/0015 |
| 2023/0089978 | A1* | 3/2023 | Pulver | G05D 1/0246 701/26 |

OTHER PUBLICATIONS

English translation of KR-20210003752-A (Year: 2021).*
Bradbury, J., et al.; "JAX: composable transformations of Python+ NumPy programs", 2018. URL http://github.com/google/jax.
Ziebart, et al.; "Maximum Entropy Inverse Reinforcement Learning," in AAAI Conference on Artificial Intelligence, vol. 8, 2008, pp. 1433-1438.
Salzmann, et al.; "Trajectron++:Dynamically-feasible Trajectory Forecasting with Heterogeneous Data"; In European Conference on Computer Vision, pp. 683-700, Springer, 2020.
Rhinehart, et al.; "Precog: Prediction Conditioned on Goals in Visual Multi-Agent Settings"; In Proceedings of the IEEE/CVF International Conference on Computer Vision, pp. 2821-2830, 2019.
Cui, et al.; "LookOut: Diverse Multi-Future Prediction and Planning for Self-Driving"; In Proceedings of the IEEE/CVF International Conference on Computer Vision, pp. 16107-16116, 2021; 10 pgs.
Chen, et al.; "Interactive Multi-Modal Motion Planning with Branch Model Predictive Control"; arXiv:2109.05128; Sep. 18, 2021, 10 pgs.
Chen, et al.; "ScePT: Scene-Consistent, Policy-Based Trajectory Predictions for Planning"; In Conference on Computer Vision and Pattern Recognition, 2022, 10 pgs.
Sadigh, et al., "Planning for Autonomous Cars That Leverage Effects on Human Actions," In Robotics: Science and Systems, 2016, 9 pgs.
Zuo, et al.; "MPC-based Cooperative Control Strategy of Path Planning and Trajectory tracking for Intelligent Vehicles," IEEE Transactions of Intelligent Vehicles, vol. X, No. X, Jan. 2020, 10 pgs.
Liebner, et al.; "Driver Intent Inference at Urban Intersections Using the Intelligent Driver Model," in 2012 IEEE intelligent vehicles symposium, 2012, 6 pgs.
Yuan, et al.; "AgentFormer: Agent-Aware Transformers for Socio-Temporal Multi-Agent Forecasting," in IEEE Int. Conf. on Computer Vision, 2021, 11 pgs.
Chen, et al.; "Tree-Structured Policy Planning with Learned Behavior Models," https://arxiv.org/abs/2301.11902; Feb. 27, 2023, 8 pgs.
Rosolia, et al.; "Autonomous Vehicle Control: A Nonconvex Approach for Obstacle Avoidance," IEEE Transactions on Control Systems Technology, vol. 25, No. 2, Mar. 2017, 16 pgs.
Censi, et al.; "A Bayesian Framework for Optimal Motion Planning with Uncertainty," i n2008 IEEE International Conference on Robotics and Automation, 2008, 8 pgs.
Batz, et al.; "Recognition of Dangerous Situations with a Cooperative Group of Vehicles," in 2009 IEEE Intelligent Vehicles Symposium. IEEE, 2009, pp. 907-912.
Ammoun, et al.; "Real Time Trajectory Prediction for Collision Risk Estimation Between Vehicles," Located at chrome-extension://efaidnbmnnnibpcajpcglclefindmkaj/https://inria.hal.science/inria-00438624/document; Dec. 4, 2009, 7 pgs.
Trautman, et al.; "Unfreezing the Robot: Navigation in Dense, Interacting Crowds," in 2010 IEEE/RSJ International Conference on Intelligent Robots and Systems, IEEE, 2010, 7 pgs.
Trautman, et al.; "Robot Navigation in Dense Human Crowds: The Case from Cooperation," in 2013 IEEE International Conference on Robotics and Automation. IEEE. 2013, 8 pgs.
Chen, et al.; "Crowd-Robot Interaction: Crowd-Aware Robot Navigation with Attention-based Deep Reinforcement Learning," https://arxiv.org/abs/1809.08835#; Feb. 19, 2019, 8 pgs.
Sidigh, et al.; "Active Preference-Based Learning of Reward Functions," 2017, 9 pgs.
Pfeiffer, et al.; "Predicting Action to Act Predictably: Cooperative Partial Motion Planning with Maximum Entropy Models," in 2016 IEEE/RSJ International Conference on Intelligent Robots and Systems (IROS). IEEE, 2016, 6 pgs.
Li, et al.; "Game Theoretic Modeling of Driver and Vehicle Interactions for Verification and Validation of Autonomous Vehicle Control Systems," https://arxiv.org/abs/1608.08589, Aug. 30, 2016, 13 pgs.
Wei, et al.; "Autonomous Vehicle Social Behavior for Highway Entrance Ramp Management," in IEEE Intelligent Vehicles Symposium, 2013, 7 pgs.
Hubmann, et al.; "Decision Making for Autonomous Driving Considering Interaction and Uncertain Prediction of Surrounding Vehicles," in IEEE Intelligent Vehicles Symposium, 2017, 8 pgs.
Hoermann, et al.; "Probabilistic Long-Term Prediction for Autonomous Vehicles," in 2017 IEEE Intelligent Vehicles Symposium (IV). IEEE, 2017, 7 pgs.
Dong, et al.; "Intention Estimation for Ramp Merging Control in Autonomous Driving," in 2017 IEEE Intelligent Vehicles Symposium (IV). IEEE, 2017, 6 pgs.
During, et al.; "Cooperative Decentralized Decision Making for Conflict Resolution Among Autonomous Agents," in 2014 IEEE International Symposium on Innovations in Intelligent Systems and Applications (INISTA) Proceedings.
Bhattacharya, et al.; "Topological Constraints in Search-Based Robot Path Planning," Autonomous Robots, vol. 33, No. 3, 2012, 23 pgs.
Yi, et al.; "Model Predictive Trajectory Planning for Automated Driving," IEEE Transactions on Intelligent Vehicles, vol. 4, No. 1, pp. 24-38, 2018.
Anderson, et al.; "Constraint-Based Planning and Control for Safe, Semi-Autonomous Operation of Vehicles," in 2012 IEEE Intelligent Vehicles Symposium. IEEE, 2012, 6 pgs.
Gurobi Optimization, LLC, "Gurobi Optimizer Reference Manual," 2023. [Online]. Available: https://www.gurobi.com; 44 pgs.
Zanelli, et al.; "Forces NLP: An Efficient Implementation of Interior-Point . . . Methods for Multistage Nonlinear Nonconvex Programs," International Journal of Control, 2017, 18 pgs.
Caesar, et al.; "NuPlan: A Closed-Loop ML-Based Planning Benchmark for Autonomous Vehicles," https://arxiv.org/abs/2106.11810; Feb. 4, 2022, 5 pgs.

* cited by examiner

SERVER(S) 978
CPU 980(A)
CPU 980(B)
PCIE SWITCH 982(A)
PCIE SWITCH 982(B)
PCIE SWITCH 982(C)
PCIE SWITCH 982(D)
986
GPU 984(A)
GPU 984(B)
GPU 984(C)
GPU 984(D)
GPU 984(E)
GPU 984(F)
GPU 984(G)
GPU 984(H)
988
NETWORK(S) 990
992
994
900

MOTION PLANNING

BACKGROUND

In interactive driving scenarios, the actions of one agent may greatly influence the actions of its neighbors. Therefore, planning safe motions for autonomous or semi-autonomous vehicles or machines may require reasoning about the impact of the vehicle's motion on the behavior of nearby agents. Ego-conditioned prediction involves an ego machine determining a motion plan while accounting for how the motion plan will impact the behavior of nearby agents. Conventionally, ego-conditioned prediction is implemented using a sampling-based planner. In the sampling-based planner, hundreds of ego motion plans may be generated, and each sample is used to predict corresponding agent behavior to score the sample, for example, based on collision avoidance and other factors. The highest scoring motion plan may then be implemented. However, sampling-based planners may consume significant computational resources, for example, due to each potential motion plan being individually evaluated and the need to repeat this process to determine a new motion plan.

Gradient-based motion planners, such as Model Predictive Control (MPC) planners, may be used to generate fine-grained high-quality motion plans in a more computationally efficient manner while accounting for the motion of nearby agents. Complexities involving the iterative nature of MPC planners and the need for using a gradient have prevented MPC planners from using ego-conditioned prediction to generate motion plans. Using a conventional MPC planner, agent trajectories may be predicted, then used as ground-truth for generating an ego motion plan. However, this approach may result in highly conservative behavior in the ego motion plan, as the MPC planner fails to incorporate or account for how the motion plan will impact the behavior of nearby agents in the environment.

SUMMARY

Embodiments of the present disclosure relate to interactive motion planning for autonomous and semi-autonomous systems and applications. Systems and methods are disclosed that may be used to plan motion for a machine using, for example, a gradient-based motion planner while accounting for the impact of ego motion on the behavior of surrounding agents. In further respects, initial routes that are optimized using a gradient-based motion planner may be selected based at least on motion classes to reduce or eliminate convergence of a motion plan to local minima.

In contrast to conventional systems, such as those described above, aspects of the present disclosure provide for a gradient-based motion planner that evaluates a cost function(s) corresponding to a route for a machine and at least one route for at least one obstacle/object/actor over one or more time steps in order to jointly update the routes. The cost function may include one or more terms to penalize deviation from one or more initial routes predicted for the obstacles, and one or more of acceleration or jerk for at least one obstacle. In further respects, initial or nominal routes for a machine and one or more agents that are updated may be selected using one or more motion classes that characterize relative motion between a route for the machine and one or more routes for one or more agents. In at least one embodiment, a motion class may be based at least on an angular distance between the machine and at least one agent. In some embodiments, a motion class may be based at least on free-end homotopy, where members of the class execute the same relative motion with respect to other agents while being continuously transformable to any other member of the class. The members of the class may have the same start point(s) and different end points.

BRIEF DESCRIPTION OF THE DRAWINGS

The present systems and methods for interactive motion planning for autonomous and semi-autonomous systems and applications are described in detail below with reference to the attached drawing figures, wherein.

DETAILED DESCRIPTION

Figure 1:
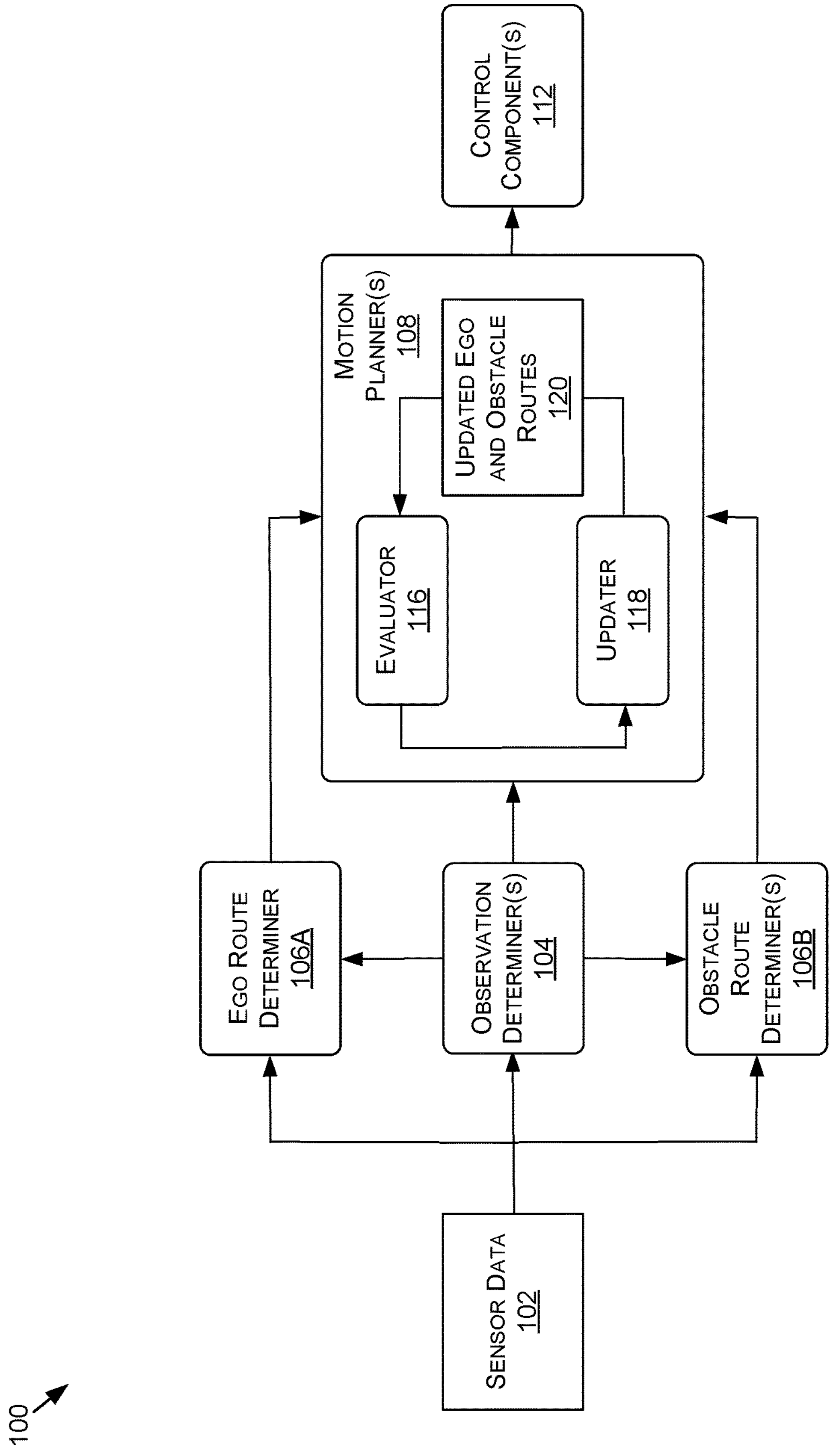
FIG. 1 includes an example data flow diagram for a process of interactive motion planning for autonomous or semi-autonomous machines, in accordance with some embodiments of the present disclosure.

Systems and methods are disclosed related to interactive motion planning for autonomous and semi-autonomous systems and applications. Although the present disclosure may be described with respect to an example autonomous vehicle 900 (alternatively referred to herein as "vehicle 900" or "ego machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to motion planning and/or determining control operations for a machine, such as an autonomous or semi-autonomous vehicle, this is not intended to be limiting, and the systems and methods described herein may be used in augmented reality, virtual reality, mixed reality, robotics, security and surveillance, autonomous or semi-autonomous machine applications, and/or any other technology spaces where evaluations of entity movement may be used.

Aspects of the present disclosure provide for evaluating a cost function(s) corresponding to a route for a machine and at least one route for at least one obstacle over one or more time steps in order to jointly update the routes. Using disclosed approaches, a gradient-based motion planner, such as a Model Predictive Control (MPC) planner, may determine a trajectory for the machine while accounting for the impact of the trajectory on the trajectories of nearby obstacles. For example, the motion planner can jointly optimize the trajectories of the machine and one or more obstacles with respect to the cost function. In at least one embodiment, the cost function includes one or more terms to penalize deviation, for one or more obstacle trajectories, from one or more initial routes predicted for the obstacles, and one or more of acceleration or jerk for at least one obstacle. The terms may be used to limit the ego machine's ability to force nearby agents to deviate from their nominal and/or likely paths.

In further respects, initial or nominal routes for a machine and one or more agents that are updated (e.g., optimized) using a gradient-based motion planner, such as an MPC planner, may be selected using one or more motion classes assigned to one or more sets of the routes. A motion class may characterize relative motion between a route for the machine and one or more routes for one or more agents. Using motion classes to select the initial or nominal routes may allow the gradient-based motion planner to efficiently search over diverse motion plans while reducing or eliminating the convergence of planning solutions to local minima, thereby resulting in improved motion plans. For example, motion classes may be defined so as to partition the solution space of the motion planner into substantially disjoint subsets. Thus, by initializing the motion planner with at least one member from each motion class, the motion planner may optimize routes for each motion class and select a most optimal solution for the motion plan.

In at least one embodiment, a motion class may be based at least on an angular distance between the machine and the at least one agent. Using angular distance, the relative motion between routes may be efficiently categorized into a clockwise (CW) mode, a stationary(S) mode, and a counterclockwise (CWW) mode while producing substantially disjoint subsets of routes. In at least one embodiment, a motion class may be based at least on free-end homotopy, where members of the class execute the same relative motion with respect to other agents while being continuously transformable to any other member of the class. The members of the class may have the same start point(s) and different end points. In various examples, free-end homotopy may be identified for sets of routes using the angular distance.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

With reference to FIG. 1, FIG. 1 includes an example data flow diagram for a process 100 for interactive motion planning for autonomous machines, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

As an overview, the process 100 may include an observation determiner(s) 104 receiving one or more portions of sensor data 102 generated or obtained using one or more sensors. The sensor data 102 may be used, at least in part, by the observation determiner 104 to generate one or more observations of an environment, such as observations of one or more entities in the environment (e.g., an ego actor and/or other actors or entities). The process 100 may also include one or more route determiners, such as an ego route determiner 106A and/or an obstacle route determiner 106B (collectively referred to as "route determiner 106") receiving one or more portions of the sensor data 102.

The route determiner(s) 106 (e.g., the ego route determiner 106A) may receive one or more portions of the sensor data 102 and/or the observations from the observation determiner 104 for use in determining or defining (e.g., predicting) one or more routes for an ego machine (e.g., the vehicle 900). The route determiner(s) 106 (e.g., the obstacle route determiner 106B) may also receive one or more portions of the sensor data 102 and/or the observations from the observation determiner 104 for use in determining or defining (e.g., predicting) one or more routes for one or more obstacles (e.g., other agents).

A motion planner(s) 108 (e.g., an MPC planner) may receive indications of the one or more routes for the ego machine, the one or more routes for the one or more obstacles, and one or more portions of the observations from the observation determiner 104. A route may refer to a path, trajectory, and/or selected course of travel or action. The motion planner 108 may use the routes and observations to iteratively determine a motion plan (e.g., a trajectory) for the ego machine. The motion plan may indicate one or more control operations corresponding to the trajectory to a control component(s) 112. The control component(s) 112 may determine controls for actuating the ego machine according to the control operations.

The motion planner 108 includes an evaluator 116 and an updater 118. In at least one embodiment, the motion planner 108 receives the indications of the one or more routes for the ego machine and the one or more routes for the one or more obstacles and uses the routes (and in some examples the observations) to configure (e.g., initialize) a problem space for the evaluator 116 (e.g., one or more cost functions, constraints, motion models, etc.) to define a solution space. The evaluator 116 may use the configured problem space to iteratively evaluate the routes. The updater 118 may iteratively update and/or refine the routes (e.g., using updated observations) to determine updated ego and obstacle routes 120 based at least on the evaluations made using the evaluator 116 (e.g., to minimize the one or more cost functions over time). One or more portions of the updated ego and obstacle routes 120 (e.g., an ego trajectory) may be provided to the control component 112 to define the trajectory for the ego machine (e.g., iteratively as the routes are updated). By jointly evaluating and updating (e.g., planning for) each of the ego and obstacle routes 120, the motion planner 108 may determine the ego route while accounting for the impact of the ego route on routes of the obstacles.

In one or more embodiments, the sensors used to generate the sensor data 102 may include at least one of one or more physical sensors in a physical environment or one or more virtual sensors in a simulated environment. For example, the one or more sensors may correspond to a physical or simulated version of the vehicle or machine 900, as described herein.

The sensor data 102 may include, without limitation, sensor data from any of the sensors of the vehicle 900 (and/or other vehicles or objects, such as robotic devices, VR systems, AR systems, MR systems, etc., in some examples). For example, and with reference to FIGS. 9A-9C, the sensor data 102 may include data generated by or using, without limitation, global navigation satellite systems (GNSS) sensor(s) 958 (e.g., Global Positioning System sensor(s), differential GPS (DGPS), etc.), RADAR sensor(s) 960, ultrasonic sensor(s) 962, LIDAR sensor(s) 964, inertial measurement unit (IMU) sensor(s) 966 (e.g., accelerometer (s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900 and/or distance traveled), and/or other sensor types.

In some examples, the sensor data 102 may include sensor data generated using one or more forward-facing sensors, side-view sensors, and/or rear-view sensors. This sensor data 102 may be useful for identifying, detecting, classifying, and/or tracking movement of objects around the vehicle 900 within the environment. In embodiments, any number of sensors may be used to incorporate multiple fields of view (e.g., the fields of view of the long-range cameras 998, the forward-facing stereo camera 968, and/or the forward facing wide-view camera 970 of FIG. 9B) and/or sensory fields (e.g., of a LIDAR sensor 964, a RADAR sensor 960, etc.).

The sensor data 102 may include image data representing an image(s), image data representing a video (e.g., snapshots of video), data representing sensory fields of sensors (e.g., depth maps for LIDAR sensors, a value graph for ultrasonic sensors, etc.), and/or data representing measurements of sensors. Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 may be used, at least in part, by the observation determiner 104 to generate one or more observations of an environment, such as observations of one or more entities in the environment (e.g., an ego actor and/or other actors or entities). An observation may correspond to one or more states of the environment where a state of the environment may correspond to one or more particular times or time steps. For example, the observation determiner 104 may determine one or more aspects of states of the environment, such as states of actors (e.g., the vehicle 900 and other objects, static or dynamic) in the environment, scene context, and/or lane information.

The state of each entity or actor may generally include one or more of a location, a speed, a direction or heading (e.g., direction of travel), a velocity, an acceleration(s) (e.g., scalar, rotational, etc.), a pose (e.g., orientation), and/or other information about the state of the actors. As examples, a state of the environment may encode or represent the position of an actor in two-dimensional space (e.g., (x, y) coordinates), a unit direction of the actor, and/or a scalar velocity of the actor at a point in time. In some examples, the state may encode or represent additional or alternative information, such as rotational velocity (e.g., yaw) and/or scalar acceleration in any direction, and/or any other abstract information associated with the entity, such as appearance, category, associated objects, associated intent, status, etc.

The observation determiner 104 may determine a state of the environment using any combination of sensors, such as the GNSS sensors 958, the IMU sensor(s) 966, the speed sensor(s) 944, the steering sensor(s) 940, etc. In at least one embodiment, the observation determiner 104 may determine and/or infer one or more portions of the state of the objects in the environment—e.g., other than the vehicle 900—using any combination of the stereo camera(s) 968, the wide-view camera(s) 970, the infrared camera(s) 972, the surround camera(s) 974, the long range and/or mid-range camera(s) 998, the LIDAR sensor(s) 964, the RADAR sensor(s) 960, the microphone(s) 996, the ultrasonic sensor(s) 962, and/or other sensors of the vehicle 900. In some examples, the state of the objects (e.g., when one or more of the objects is another vehicle, or a person using a client device capable of wireless communication) may be determined using wireless communications, such as vehicle-to-vehicle communication, or device-to-vehicle communication, over one or more networks, such as, but not limited to, the network(s) described herein.

In at least one embodiment, the states of the environment may include one or more characteristics of the environment, for example, to provide context to the states of the entities (e.g., semantic information). Examples of the one or more characteristics include lane information, road geometry characteristics, road feature characteristics (e.g., signs, road type, road markings, road conditions, etc.), weather characteristics, visibility characteristics, and/or other extrinsic characteristics which may impact the control action behavior of at least one of the entities. In at least one embodiment, the one or more characteristics may be determined, at least in part, using map data (e.g., as described herein).

In at least one embodiment, one or more of the observations may be encoded in a lane graph. The lane graph may represent lanes available to the agents and may be annotated using observation data. For example, lanes may be modeled as directed edges in a graph. Each edge in the lane graph may correspond to a specific lane segment, and nodes in the graph may represent lane endpoints or intersections. Each lane segment may be assigned various attributes, such as position, width, and speed limit, as well as any traffic signs or road markings that may be present. Additionally, the lane graph may include information about traffic flow and congestion, which may be used for planning and control.

In some examples, machine learning models, such as neural networks (e.g., convolutional neural networks), may be used to determine the states of the actors and/or the environment. For example, sensor data from the sensors of the vehicle 900 may be applied to one or more machine learning models in order to determine the state of the objects and/or the environment. The neural networks may execute on processed and/or unprocessed data for a variety of functions. For example, and without limitation, a convolutional neural network may be used for object detection and identification (e.g., using sensor data from camera(s) of the vehicle 900), a convolutional neural network may be used for distance estimation (e.g., using the sensor data from the camera(s) of the vehicle 900), a convolutional neural network may be used for emergency vehicle detection and identification (e.g., using sensor data from the microphone(s) of the vehicle 900), a convolutional neural network may be used for facial recognition and vehicle owner identification (e.g., using the sensor data from the camera(s) of the vehicle 900), a convolutional neural network may be used for identifying and processing security and/or safety related events, and/or other machine learning models (MLMs) may be used. In examples using convolutional neural networks, any type of convolutional neural networks may be used, including region-based convolutional neural networks (R-CNNs), Fast R-CNNs, and/or other types. In addition to or alternatively from CNNs, any other type of machine learning model may be implemented-such as one or more large language models (LLMs) or other generative AI models for evaluating information about a scene or environment and using this to make predictions about planning, control, world model management, etc.

For example, and without limitation, any of the various MLMs described herein may include one or more of any type(s) of machine learning model(s), such as a machine learning model using linear regression, logistic regression, decision trees, support vector machines (SVM), Naïve Bayes, k-nearest neighbor (Knn), K means clustering, control barrier functions, random forest, dimensionality reduction algorithms, gradient boosting algorithms, neural networks (e.g., one or more auto-encoders, convolutional, recurrent, perceptrons, Long/Short Term Memory (LSTM), Hopfield, Boltzmann, deep belief, deconvolutional, generative adversarial, liquid state machine, large language model, transformer, diffusion, etc. neural networks), and/or other types of machine learning model.

In embodiments where the sensor data 102 corresponds, at least in part, to simulated sensor data, the simulated sensor data may be generated using one or more simulators. For example, the simulated sensor data may correspond to simulation data generated using a simulation application, such as an autonomous vehicle drive simulator (e.g., NVIDIA's DRIVESIM) and/or a robotics simulator (e.g., NVIDIA's ISAAC SIM).

The simulation data may include snapshots, pictures, samples and/or other data about the world state of the simulated or virtual world at each frame. Where a simulated environment is used, the sensor data generated may be converted to a format that matches real-world sensor data corresponding to real-world sensors associated with or disposed on one or more machines. For example, the simulated sensor data may include information about where actors are located in the world, their speeds, accelerations, poses, etc., information about the state of traffic lights or signals, information about the location of traffic signs, stop lines, etc. The world-state may be perceived by the vehicle 900, other vehicles, and/or other systems.

In at least one embodiment, at least a portion of the observation determiner 104 may be included in a perception component, module, system, and/or block (e.g., of the vehicle 900). For example, the observation determiner 104 may provide one or more outputs of a perception module. In at least one embodiment, the observation determiner 104 may perform object detection and/or tracking to generate observations of an environment.

The ego route determiner 106A may receive one or more portions of the sensor data 102 and/or the observations from the observation determiner 104 for use in determining or defining (e.g., planning) one or more routes for the ego machine. The obstacle route determiner 106B may receive one or more portions of the sensor data 102 and/or the observations from the observation determiner 104 for use in determining or defining (e.g., predicting) one or more routes for one or more objects. The ego route determiner 106A and the obstacle route determiner 106B may operate independently, for example using respective neural networks to predict corresponding routes. In other examples, the ego route determiner 106A and the obstacle route determiner 106B may operate, for example, using one or more neural networks to jointly predict corresponding routes.

The ego route determiner 106A may take a variety of forms and use a variety of potential approaches for indicating one or more routes of the ego machine to the motion panner 108. For example, the ego route determiner 106A may determine and provide route information to the motion planner 108, where the route information may represent one or more of at least a portion of one or more predicted trajectories for the ego machine, one or more predicted locations for the ego machine, one or more predicted states for the ego machine, and/or one or more goal locations and/or trajectories for the ego machine. The motion planner 108 may use the route information to configure the problem space, the solution space, goal states or locations, and/or an initial trajectory or path for the ego machine. In at least one embodiment, the route information represents one or more planned trajectories for the ego machine, which are included in the updated ego and obstacles routes 120 the motion planner 108 iteratively updates and/or refines. For example, a planned trajectory may serve as desired and/or reference trajectory for the ego machine.

In at least one embodiment, the ego route determiner 106A uses one or more observations and/or states of the environment (e.g., current and/or historical) provided from the observation determiner 104 to determine or generate one or more planned locations for the ego machine in the environment. For example, the ego route determiner 106A may generate data indicating one or more planned locations for the ego machine for one or more particular times or time steps. For example, the ego route determiner 106A may determine one or more planned trajectories for the ego machine.

Various approaches may be used to implement the ego route determiner 106A. By way of example, and not limitation, the ego route determiner 106A may be implemented using a route planner that distills lane information and a reference trajectory from the lane graph. In at least one embodiment, the ego route determiner 106A performs a depth-first search in the lane graph and generates a connected lane sequence while balancing distance to the ego vehicle, the length of the lane plan, and the total curvature of the lane plane. With a lane sequence selected, the ego route determiner 106A may generate the reference trajectory via interpolation given a desired ego velocity and/or other motion parameters. The ego route determiner 106A may further use the reference trajectory or lane sequence to distill the lane information (e.g., lane boundaries) for use by the motion planner 108.

The obstacle route determiner 106B may take a variety of forms and use a variety of potential approaches for indicating one or more routes of one or more obstacles to the motion panner 108. For example, the obstacle route determiner 106B may determine and provide route information to the motion planner 108, where the route information may represent one or more of: at least a portion of one or more predicted trajectories for one or more of the obstacles; one or more predicted locations for one or more of the obstacles; one or more predicted states for one or more of the obstacles; and/or one or more goal locations and/or trajectories for one or more of the obstacles. The motion planner 108 may use the route information to configure the problem space, the solution space, goal states or locations, and/or an initial trajectory or path for one or more of the obstacles. In at least one embodiment, the route information represents predicted trajectories of obstacles. The predicted trajectories of the obstacles may be iteratively updated and/or refined to generate the updated ego and obstacles routes 120. For example, the predicted trajectories may serve as desired and/or reference trajectories for agents.

In at least one embodiment, the obstacle route determiner 106B uses one or more observations and/or states of the environment (e.g., current and/or historical) provided from the observation determiner 104 to determine or generate one or more predicted locations for the one or more entities or actors in the environment. For example, the obstacle route determiner 106B may generate data indicating one or more predicted locations for one or more entities for one or more particular times or time steps. For example, the obstacle route determiner 106B may determine one or more predicted trajectories for one or more entities.

Various approaches may be used to implement the obstacle route determiner 106B. By way of example, and not limitation, the obstacle route determiner 106B may be implemented using one or more MLMs, such as at least one neural network. The one or more MLMs may be trained to predict data indicating the one or more predicted locations for one or more entities or actors in the environment, such as data representing and/or indicating one or more parameters of one or more future or predicted world-states for one or more particular times or time steps. In at least one embodiment, the one or more MLMs include a graph-structured recurrent neural network that predicts an agent's future position distribution given its past trajectory history and the past trajectories of one or more neighboring agents. In at least one embodiment, the one or more MLMs may use at least one neural network, such as a conditional variational autoencoder (CVAE) to model the potential for multiple future trajectories.

In at least one embodiment, the route determiner 106 takes H seconds of state history for one or more agents as input, and outputs multimodal trajectory predictions for an agent $\alpha \in A$ in accordance with Equation (1), $$\hat{s}_a^{1-T}(\theta) = \left\{\hat{s}_{a,k}^{1:T}(\theta)\right\}_{k \in K} = CVAE\left(s_{a' \in A}^{(-H:0)}; \theta\right), \tag{1}$$

where $k \in K$ is the mode of the output distribution, s refers to a state, and θ refers to training parameters of the obstacle route determiner 106B.

$$\hat{s}_a = \hat{s}_a^{1:T}(\theta)$$

may be used herein for brevity. In at least one embodiment, an encoder of the obstacle route determiner 106B (e.g., a CVAE) may process agent state histories using recurrent long short-term memory network (LSTM) networks and model inter-agent interactions using graph-based attention. A decoder of the obstacle route determiner 106B (e.g., the CVAE) may include a gated recurrent unit (GRU) that outputs a gaussian mixture model (GMM) for each future time step. In at least one embodiment, the GMM modes may correspond to one or more discrete latent states of the motion planner.

In at least one embodiment, to ensure predictions are dynamically feasible, the GMMs may be defined over controls, then integrated through a differentiable dynamics function to produce at least a portion of an obstacle trajectory. In at least one embodiment, input states to the obstacle route determiner 106B may be augmented with one or more variables (e.g., ego-indicator variables), ego states, and/or other state-related information described herein, such as for ego-agent relation reasoning. In at least one embodiment, the obstacle route determiner 106B performs unconditioned prediction for the obstacles. For example, the obstacle route determiner 106B may perform trajectory prediction to provide one or more scene-centric trajectory predictions for each agent, without ego-conditioning. At least one embodiment, the obstacle route determiner 106B generates multiple samples (e.g., four samples) of predicted future trajectories that span a duration of time (e.g., three seconds).

The motion planner 108 (e.g., an MPC planner) may use the routes and observations from the router determiners 106 and the observation determiner 104 to iteratively determine a motion plan (e.g., a trajectory) for the ego machine. For example, the motion planner 108 may use the routes and observations to configure (e.g., initialize) a problem space for the evaluator 116 to define a solution space for the motion plan. In at least one embodiment, the problem space may be defined using one or more cost functions (or optimization functions), constraints, and models (e.g., dynamic or motion models). The evaluator 116 may evaluate, over one or more time steps, the one or more cost functions corresponding to the routes. Based at least on the evaluating, the evaluator 116 may determine one or more cost values corresponding to the one or more cost functions. The updater 118 may update and/or refine, over the one or more time steps and using the one or more cost values, the routes, resulting in the updated ego and obstacle routes 120.

In various examples, the one or more cost functions (e.g., analytic functions) may be generated to quantify optimization goals and conditions for the motion plan (e.g., using the state observations and the nominal routes). In at least one embodiment, the one or more cost functions include one or more terms that factor in safety or collision avoidance considerations, comfort considerations, consistency considerations, power/gas consumption considerations, conforming to rules of the road, etc. for one or more obstacles and/or the ego machine.

In at least one embodiment, the one or more cost functions include one or more terms to ground the updated ego and obstacle routes 120 to the predicted and/or desired (or nominal) trajectories for the agents. For example, the one or more terms may impose a cost on the ego machine forcing nearby agents to deviate from their nominal paths. In at least one embodiment, the one or more terms penalize deviation from the route information provided to the motion planner 108 by the obstacle route determiner 106B. For example, the one or more terms may penalize deviation from the predicted trajectories provided to the motion planner 108. Additionally, or alternatively, the one or more cost functions may include one or more terms that penalize one or more of acceleration, jerk, and/or other motion or route characteristics for at least one obstacle.

In at least one embodiment, the one or more cost functions include one or more terms that penalize the ego machine's tracking error with respect to the route information provided to the motion planner 108 by the ego route determiner 106A. For example, the one or more terms may penalize deviation from the planned and/or nominal trajectory provided to the motion planner 108 for the ego machine. Additionally, or alternatively, the one or more cost functions may include one or more terms that penalize one or more of acceleration, jerk, and/or other motion or route characteristics for the ego machine.

In at least one embodiment, one or more models may be used to define one or more dynamic constraints for the problem space. A dynamic constraint may impose restrictions on the evolution of the system's state variables over time. For example, a dynamic constraint may be used to ensure that the updated ego and obstacle routes follow a physical or dynamic model to, for example, adhere to the laws of physics. By way of example, and not limitation, a Dubin's car model may be used to define dynamic constraints for all vehicles and cyclists in the scene (including the ego machine). The dynamic constraints may be based at least on longitudinal and lateral coordinates, longitudinal velocity and acceleration, heading angle, and yaw rate. Dynamic constraints for pedestrians may be defined using a double integrator model.

In at least one embodiment, dynamic constraints (e.g., dynamic equality constraints) may be imposed on state and inputs of the agents (input and state bounds), for example, using a velocity range, a maximum lateral acceleration, lower and upper bounds for longitudinal acceleration, a maximum steering angle, a distance between front and rear axles. Dynamic constraints for pedestrians may follow a norm bound on velocity and acceleration.

In at least one embodiment, one or more safety constraints may be defined for the problem space, such as one or more collision avoidance constraints and one or more lane boundary constraints. In at least one embodiment, machines (e.g., vehicles) may be modeled using rectangles and/or other shapes and pedestrians may be modeled using circles and/or other shapes (e.g., circles having a varying radius). The collision avoidance constraints may be encoded, for example, for pedestrians (e.g., circles) and machines (e.g., rectangles) based at least on checking cases where a maximum margin is achieved on the X axis, Y axis, and corners of the machines. Between machines, polytopic free spaces may be analytically calculated around one of the machines and linear constraints may be enforced such that the corners of the other machine and the center point all lie in one of the free spaces. The same may be repeated after reversing the roles of the machines.

In at least one embodiment, a lane boundary constraint may be encoded using polylines (e.g., a sequence of waypoints with headings). The lane boundary constraints may be enforced, for example, based at least on projecting the machine centers to polylines and calculating the distance margins.

In at least one embodiment, the constraints may be differentiable with respect to the state of the ego machine and other agents and may be linearized and enforced as linear constraints by the motion planner 108. In at least one embodiment, the motion planner 108 uses the routes to initialize a nonlinear planning problem. The nonlinear planning problem may be linearized around the routes to generate an efficiently solvable Quadratic Program (QP), such as a Sequential Quadratic Program (SPQ). The QP may be formulated using the one or more cost functions and one or more constraints, as described herein. In at least one embodiment, the problem space may be configured using any number of sets of ego routes and one or more obstacle routes or trajectories. In at least one embodiment, the problem space is configured using automatic differentiation to linearize the costs, constraints, and dynamics to formulate a QP for each initial set of trajectories (a set may include an ego route and one or more obstacle routes). In at least one embodiment, the sets of trajectories may be linearized in parallel to generate the QPs.

In at least one embodiment, the QP is defined in accordance with Equations (2), (3), (4), (5), and (6):

$$\min_{u_e,u_o,x_e,x_o} \eta_e\left(\mathcal{J}_{ref}(x_e, x_{ref}) + \mathcal{J}_{ref}(u_e)\right) + \eta_o\left(\mathcal{J}_{dev}(x_o, x_{pred}) + \mathcal{J}_u(u_o)\right) \tag{2}$$

$$\text{s.t. } x_e[0] = x_e^0,\ x_o[0] = x_o^0 \tag{3}$$

$$\forall\, t = 0, \ldots, T-1,\ i \in \{e, o_1, \ldots o_n\},$$

$$x_i[t+1] = A_i[t]x_i[t] + B_i[t]u_i[t] + C_i[t] \tag{4}$$

$$G_{x,i}^d[t]x_i[t] + G_{u,i}^d[t]u_i[t] \le g^d[t] \tag{5}$$

$$\forall\, t = 1, \ldots, T,\ G_e^s[t]x_e[t] + G_o^s[t]x_o[t] \le g^s[t], \tag{6}$$

where $x_e$ refers to a future state(s) of the ego machine, $x_{o_i}$ refers to a future state(s) of agent i, A, B, and C refer to matrices corresponding to dynamic equality constraints, $$G_x^d,\ G_u^d, \text{ and } g^d$$

refer to matrices corresponding to input and state bounds (as described herein), $$G_e^s,\ G_o^s, \text{ and } g^s$$

define safety constraints, such as collision avoidance, lane boundary, and a homotopy constraint (e.g., as described herein).

The cost terms may include $\mathcal{J}_{ref}$ that prompts the ego machine to track the desired trajectory corresponding to $x_{ref}$, $\mathcal{J}_u$ that penalizes acceleration and jerk (e.g., both angular and linear), and $\mathcal{J}_{dev}$ that penalizes deviation by the agents from the initial routes and/or trajectories corresponding to $x_{pred}$. The distribution of emphasis on the ego machine and the agents may be determined by $\eta_e$ and $\eta_o$. A relatively large $\eta_e$ may cause more selfish and intrusive behavior by the ego machine with respect to the agents and a relatively small ne may cause more altruistic ego behavior with respect to the agents.

The evaluator 116 may use the configured problem space to iteratively evaluate the routes (e.g., in accordance with the QP) as they are updated by the updater 118. The updater 118 may iteratively update and/or refine the routes (e.g., using updated observations) to determine updated ego and obstacle routes 120 based at least on the evaluations made using the evaluator 116 (e.g., in accordance with the QP to minimize the one or more cost functions over time). One or more portions of the updated ego and obstacle routes 120 (e.g., an ego trajectory) may be provided to the control component 112 to define the trajectory for the ego machine (e.g., iteratively as the routes are updated). For example, the future state of the ego machine $X_e$ may be provided to the control component 112 in each iteration of the updating and the evaluating. By jointly evaluating and updating both the ego and obstacle routes 120, the updater 118 may determine the ego route while accounting for the impact of the ego route on routes of the obstacles.

Figure 2:
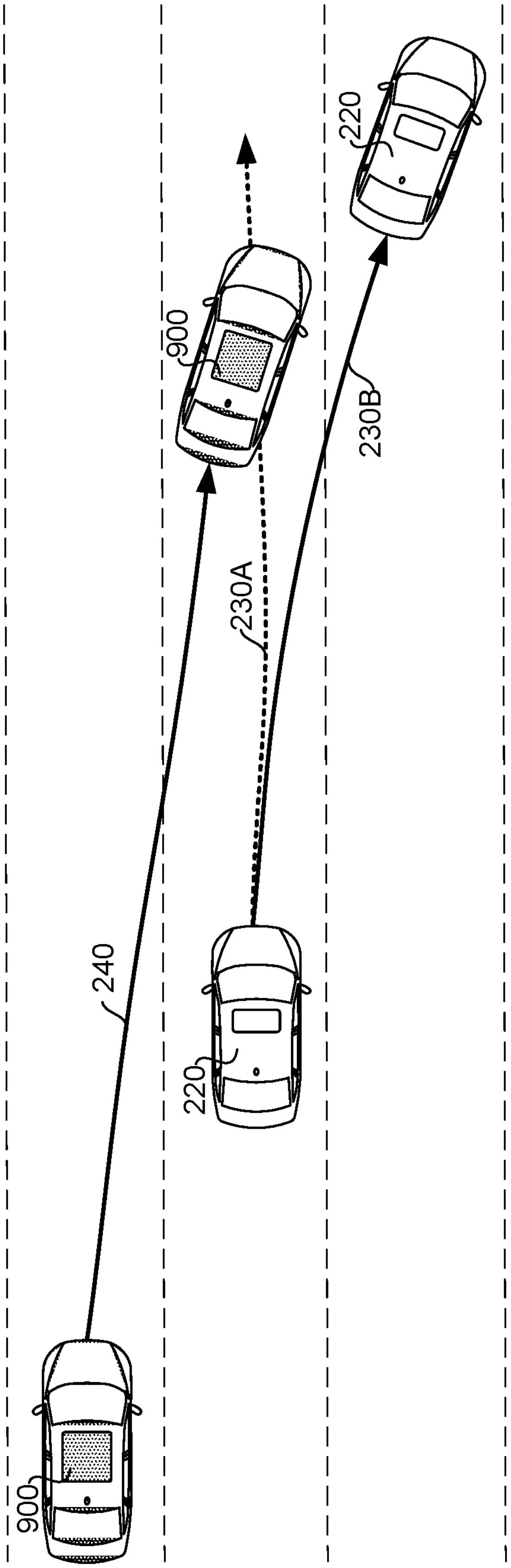
FIG. 2 illustrates examples of an initial route for an agent with jointly optimized trajectories for the agent and an ego machine, in accordance with some embodiments of the present disclosure.

Referring now to FIG. 2, FIG. 2 illustrates examples of a route 230A for an agent 220 with jointly optimized trajectories for the agent 220 and the vehicle 900, in accordance with some embodiments of the present disclosure. In FIG. 2, the route 230A (e.g., from the obstacle route determiner 106B) may be evaluated and updated jointly with a route (not shown in FIG. 2) of the vehicle 900 (e.g., from the ego route determiner 106A) to result in the route 230B for the agent 220 and a route 240 for the vehicle 900. For example, the routes 230B and 240 may correspond to a solution to a joint optimization of the problem space performed using the motion planner 108. Thus, the motion planner 108 may plan trajectories for the ego machine and one or more nearby agents, which may be similar to ego-conditioned prediction that roughly centers around unconditioned trajectory prediction for the agent(s).

As indicated in FIG. 2, in planning the route 240, the evaluator 116 and updater 118 of the motion planner 108 allowed for the vehicle 900 to change lanes by accounting for the agent 220 swerving to avoid a collision with the vehicle 900 (e.g., while penalizing the deviation of the agent 220 from the route 230A). Without accounting for how the agent 220 may react to the vehicle 900, the motion planner 108 may operate in an overly conservative manner and be incapable of providing the route 240 for the vehicle 900.

As described herein, in at least one embodiment, the motion planner 108 may linearize and solve each nonlinear trajectory optimization problem as a QP in an SQP manner for multiple rounds, or iterations. In each round, the evaluator 116 may evaluate the ego and obstacle routes to compute one or more cost values of the one or more cost functions. The updater 118 may, based at least on the cost values, determine a solution (e.g., the updated ego and obstacle routes 120). For example, the updater 118 may use the one or more cost values to compute one or more gradients of the one or more cost functions with respect to control inputs for the ego machine. A gradient may indicate how the one or more cost functions will change with variations in the control inputs (e.g., steering and/or acceleration controls). Thus, updater 118 may use the computed gradients along with the constraints and the dynamics of the system to iteratively update the control inputs in light of the one or more cost functions and the constraints. The evaluator 116 may then use the solution from the previous round, or iteration, as the updated linearization point. In at least one embodiment, the updater 118 uses a proximal constraint to limit the difference in solutions between rounds to stabilize the SQP.

In various embodiments, the motion planner 108 solves, updates, or optimizes, the trajectories over a planning or prediction horizon (a finite time interval having one or more time steps over which ego and/or obstacle behavior is predicted) and applies the updated ego trajectory to the control component 112 over a control horizon (e.g., a shorter horizon over which control actions are applied to the ego machine, such as the first time step of the prediction horizon). Using QPs, the motion planner 108 may iteratively solve constrained nonlinear optimization problems. At each iteration for each time step in the planning horizon, the evaluator 116 may linearize the nonlinear cost function and constraints around the current solution and then solve a QP subproblem to find the next search direction until convergence is achieved or a termination condition is otherwise met. The updater 118 may update one or more state parameters for the motion planner 108 and re-configure the inputs for a next time step(s). In at least one embodiment, the updater 118 updates the inputs for the next time step based at least on the most recent state information and shifts the planning horizon forward in time to implement a receding horizon strategy.

In at least one embodiment, the updater 118 uses one or more observations from the observation determiner 104 to obtain current states based on available sensor measurements. In at least one embodiment, the updater 118 ensures the states and inputs satisfy the constraints specified in the problem space formulation. In at least one embodiment, if any constraints are violated, the updater can apply constraint handling techniques like constraint relaxation, constraint softening, or constraint tightening to find a feasible solution.

While the motion planner 108 is described with respect to SQPs and QPs, the motion planner 108 may be implemented using various approaches, which may or may not involve the linearization of the problem space. For example, the motion planner 108 may be implemented using various forms of MPC and/or gradient-based motion planners. In at least one embodiment, the motion planner 108 predicts the future behavior over the prediction horizon and optimizes control inputs for the ego machine over a control horizon. In at least one embodiment, the problem space may be formulated with an infinite prediction horizon, while still optimizing control inputs over a finite control horizon. In at least one embodiment, the problem space is formulated with a finite prediction horizon that is shorter than the control horizon. In at least one embodiment, one or more of the prediction or control horizons may vary, for example, to handle stochastic variations in the system.

In at least one embodiment, the motion planner 108 may only jointly optimize routes for a subset of one or more nearby agents. However, the motion planner 108 may still account for one or more of the remaining agents, for example, using the constraints, such as collision avoidance constraints. In at least one embodiment, whether the motion planner 108 jointly optimizes a route for an agent may be based at least on one or more distances of the agent (e.g., a minimum distance) to the ego machine along the initial route for the agent. In at least one embodiment, when there are fewer agents than the prescribed number, the motion planner 108 may be padded with one or more dummy agents.

The QPs may be computed using Just-In-Time (JIT) compilation. In at least one embodiment, to avoid frequent JIT compilation, the quantity of agents that have optimized routes and non-optimized routes may be fixed to provide a fixed problem dimension for the motion planner 108. When the quantity of observable agents is greater than the prescribed number, the additional agents may be discarded, for example, based at least on distances from the ego machine along the predicted obstacle trajectories.

Motion Planning Using Motion Classes

Further aspects of the disclosure provide for motion planning one or more routes for one or more agents (e.g., one or more ego routes, one or more obstacles routes, etc.) using one or more motion classes, where routes may be categorized based at least on motion characteristics of the routes. Using motion classes can, for example, allow for a motion planner (e.g., a gradient-based motion planner, such as an MPC planner) to efficiently search over diverse motion plans while reducing or eliminating the convergence of planning solutions to local minima, thereby resulting in improved motion plans.

In various embodiments, motion classes may be implemented with a motion planner that may or may not jointly plan ego and obstacle motion. For example, the motion planner may be described in relation to the motion planner 108, which jointly plans ego and obstacle motion. However, motion classes may be used without necessarily planning ego and obstacle motion.

In at least one embodiment, the ego route determiner 106A determines a plurality of trajectories. For example, the ego route determiner 106A may use the state of the ego machine and the lane information to generate trajectory samples for the trajectory of the ego machine (e.g., using a spline sampler). The motion planner 108 may categorize the plurality of trajectories into one or more motion classes and select one or more of the trajectories based at least on the corresponding motion classes. The motion planner 108 may then use the selected trajectories to initialize and/or configure one or more problem spaces, as described herein.

In at least one embodiment, motion of the plurality of trajectories are categorized relative to one or more obstacle routes determined using the obstacle route determiner 106B. For example, the motion planner 108 may categorize sets of ego and obstacle routes into one or more motion classes. The motion planner 108 may select one or more sets of the trajectories based at least on the corresponding motion classes. The motion planner 108 may then use the selected sets of trajectories to initialize and/or configure one or more problem spaces, as described herein.

In various examples, when multiple trajectories are used to initialize the motion planner 108, the motion planner 108 may evaluate, update, and select one of the updated ego and obstacle routes 120 for providing to the control component 112 and/or for a subsequent iteration or time step. For example, the motion planner 108 may select a future state of the ego vehicle $x_e$ from a plurality of the future states for the various nominal ego routes based at least on the corresponding cost value(s) (e.g., that corresponds to the lowest cost score(s)) and/or based at least on likelihoods of the prediction modes or classes occurring.

In at least one embodiment, one or more of the motion classes may be implemented using concepts related to a homotopy class. Typically, two continuous trajectories $x_1$: $\mathbb{R} \rightarrow X$ and $x_2$: $\mathbb{R} \rightarrow X$ belong to the same homotopy class if the trajectories connect the same start and end coordinates $x_s$ and $x_g$, respectively, and if one can be continuously deformed into the other without intersecting any obstacles. However, many motion planners, for example for autonomous driving, may not have a fixed end point. Thus, in at least one embodiment, a motion class may be based at least on free-end homotopy where the end coordinates of the continuous trajectories in the same free-end homotopy class may be different.

In at least one embodiment, the motion planner 108 may determine whether a trajectory belongs to a homotopy class using magnetic-field homotopy. Magnetic-field homotopy may be based on Ampere's law, set forth in Equation (7):

$$\oint_c B \cdot dl = \mu_0 I_{enc}, \tag{7}$$

in which the line integral of the magnetic field B around a closed curve is equal to the product of the magnetic constant $\mu_0$ and the current enclosed $I_{enc}$. Ampere's law establishes an equivalence condition among all closed curves that enclose the same current, which can be extended to curves sharing the same starting and ending position. Applying Ampere's law to homotopy classes in motion planning, obstacles may carry current and the Ampere circuit integral can be calculated along the ego machines trajectory. The calculated Ampere circuit integral can be used to categorize trajectories into different homotopy and/or motion classes.

In 2D space, all obstacles may be viewed as having genus (number of holes) 0 and the imaginary current can be set perpendicular to the X-Y plane crossing the center of the obstacle. Further, the path integral of the magnetic field can be computed using Biot-Savart law, where the magnetic field near an infinitely long wire at point p with current/perpendicular to the X-Y plane may be given by Equation (8):

$$B(r) = \frac{\mu_o I}{2\pi \|r\|}, \tag{8}$$

and the direction may follow the right-hand law. It follows that the path integral of the magnetic field along a directional curve that does not intersect with p is $$\frac{\mu_o I}{2\pi} \Delta\theta,$$

$\Delta\theta$ may refer to an angular distance from the start point $x_s$ to the end point $x_g$.

Figure 3A:
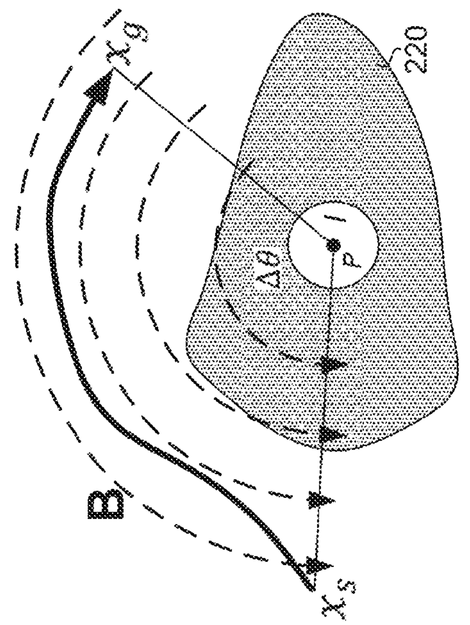
FIG. 3A illustrates an example of a magnetic path integral for an agent, in accordance with some embodiments of the present disclosure.

Referring now to FIG. 3A, FIG. 3A illustrates an example of a magnetic path integral for the agent 220, in accordance with some embodiments of the present disclosure. FIG. 3A illustrates an example where the imaginary current that goes through the center p of the agent 220 generates a magnetic field B-visualized with dashed lines. The path integral is proportional to the angular distance from the start point $x_s$ to the end point $x_g$ of the curve for the vehicle 900. FIG. 3A indicates that the angular distance is directional and can be negative. When the curve circles p counterclockwise/clockwise once, the angular distance increases/decreases by $2\pi$, respectively.

Thus, in at least one embodiment, the motion planner 108 may categorize sets of routes for the machine and the at least one agent based at least on angular distances between the machine and the at least one agent to determine categorized sets of the routes. Using angular distance to categorize routes may be beneficial in that determining angular distance is computationally efficient. Further, using angular distance to categorize routes may be computationally efficient to enforce a corresponding constraint on the motion planner 108. Additionally, using angular distance to categorize routes may be beneficial in that angular distance can be efficiently extended to moving obstacles, as described herein.

In various examples, the motion planner 108 may discretize the (X, Y) coordinates of the curves into a sequence of waypoints $$\{(X_i, Y_i)\}_{i=1}^N, \{(X_i^o, Y_i^o)\}_{i=1}^N$$

with the angular distance $\Delta\theta$ being computed in accordance with Equation (9):

$$\Delta\theta(x, x^o) := \sum_{i=1}^{N-1} \arctan\frac{Y_{i+1} - Y_{i+1}^o}{X_{i+1} - X_{i+1}^o} - \arctan\frac{Y_i - Y_i^o}{X_i - X_i^o} \tag{9}$$

where x may refer to a trajectory for the ego machine and $x^o$ may refer to a trajectory for an obstacle.

As described herein, a motion class may be based at least on free-end homotopy where the end coordinates of continuous trajectories in the same free-end homotopy class may be different (while sharing the same starting point). In various examples, free-end homotopy may be used to define motion classes whose members execute the same relative motion with respect to other agents (e.g., overtake from left of agent 1 and stay behind agent 2) while being continuously transformable to any other member of the class. Using free-end homotopy classes may facilitate efficient motion planning by, for example, allowing for the motion planner 108 to down sample motion plan candidates to only those that belong to different free-end homotopy classes (classes with different relative motions with respect to obstacles) while still substantially covering the problem space.

For example, modes m: $(x, x^o) \mapsto m(x, x^o) \in \mathbb{Z}$ may be defined in accordance with Equation (10):

$$m(x, x^o) := \begin{cases} -(k+1), & -(\hat{\theta} + k\pi) \le \Delta\theta(x, x^o) < -(\hat{\theta} + (k+1)\pi) \\ 0, & -\hat{\theta} \le \Delta\theta(x, x^o) < \hat{\theta} \\ k+1, & \hat{\theta} + k\pi \le \Delta\theta(x, x^o) < \hat{\theta} + (k+1)\pi \end{cases} \tag{10}$$

where $\hat{\theta}$ may represent a threshold for differentiating between the modes, or classes. In at least one embodiment, the modes may include to a clockwise (CW) mode, a stationary(S) mode, and a counterclockwise (CWW) mode.

Figure 3B:
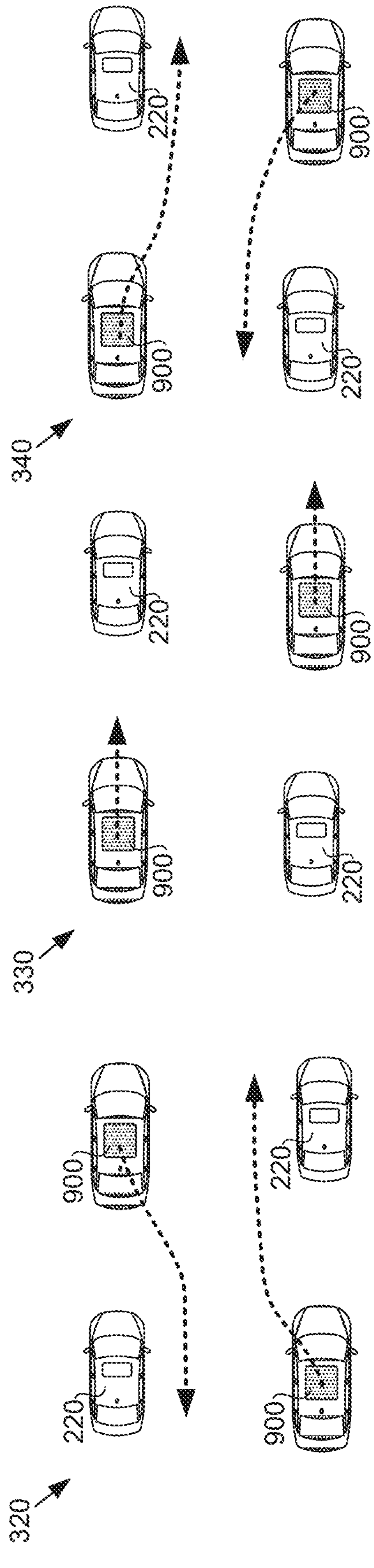
FIG. 3B includes an illustration used to describe examples of homotopy classes, in accordance with some embodiments of the present disclosure.

Referring now to FIG. 3B, FIG. 3B includes an illustration used to describe examples of homotopy classes 320, 330, and 340, in accordance with some embodiments of the present disclosure. The homotopy class 320 corresponds to a CW mode where the vehicle 900 moves clockwise relative to the agent 220. The homotopy class 330 corresponds to an S mode where the vehicle 900 remains roughly static relative to the agent 220 (within the threshold $\hat{\theta}$). The homotopy class 340 corresponds to a CCW mode where the vehicle 900 moves counterclockwise relative to the agent 220.

In further examples, modes with more or less refined quantization can be used. For example, more or fewer modes could be used than then CW mode, the S mode, or the CCW mode. In various examples, the modes may be defined to cover the typical driving scenarios that the motion planner 108 may plan for.

In at least one embodiment, if the motion planner 108 is accounting for M obstacles in the scene, the motion planner 108 may define a mode vector h for each ego trajectory x as the cartesian product of the modes with respect to each obstacle M, for example, in accordance with $$h(x, \{x_i^o\}_{i=1}^M) := (m(x, x_1^o), \ldots , m(x, x_M^o)).$$

Figure 4:
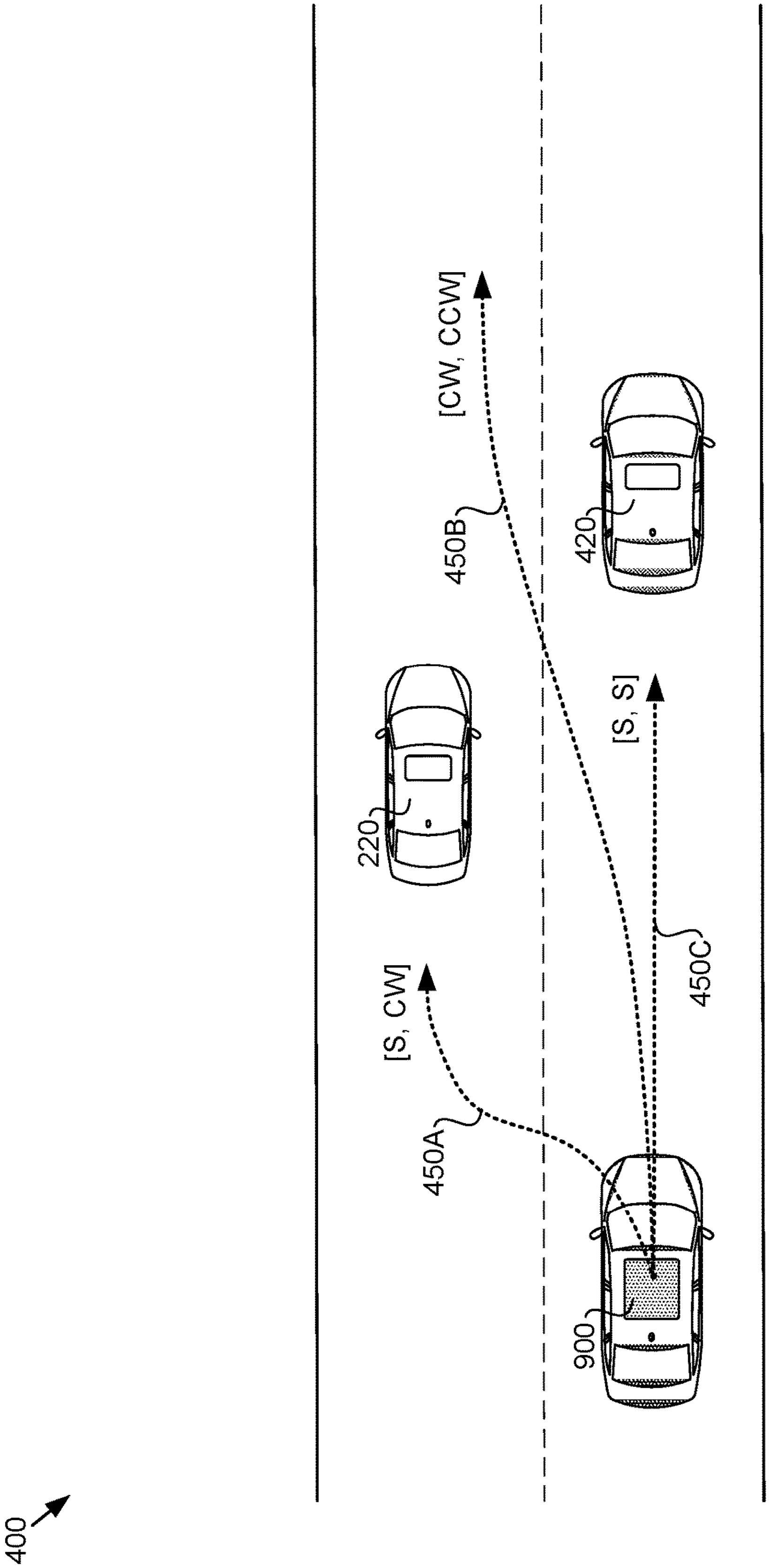
FIG. 4 illustrates an example of a scene including an ego machine and multiple agents with corresponding modes that may be assigned to potential routes for the ego machine, in accordance with some embodiments of the present disclosure.

Referring now to FIG. 4, FIG. 4 illustrates an example of a scene 400 including the vehicle 900 and multiple agents 220 and 420 with corresponding modes that may be assigned to potential routes for the ego machine, in accordance with some embodiments of the present disclosure. For example, the mode vector h is illustrated for the scene 400 with the agents 220 and 420 near the vehicle 900 and corresponding example trajectories 450A, 450B, and 450C. For the trajectory 450A, the mode vector includes an S mode with respect to the agent 440 and a CW mode with respect to the agent 220. For the trajectory 450B, the mode vector includes an S mode with respect to the agent 220 and an S mode with respect to the agent 420. For the trajectory 450C, the mode vector includes a CW mode with respect to the agent 440 and a CCW mode with respect to the agent 220.

Let $x_1$: $\mathbb{R} \rightarrow X$ and $x_2$: $\mathbb{R} = \rightarrow X$ refer to two continuous trajectories that share the same start point, but do not necessarily share the same end point. A continuous mapping f: $[0,1]\times\mathbb{R} \rightarrow X$ may be referred to as a free-end homotopy if $f(0,\cdot)=x_1(\cdot)$, $f(1,\cdot)=x_2(\cdot)$, and for all $\lambda\in[0,1]$, the mode vector ha for $f(\lambda,\cdot)$ is equal. If a free-end homotopy exists between $x_1$ and $x_2$, the two ego trajectories may be referred to as free-end homotopic. For example, all trajectories that are free-end homotopic can be continuously transformed from one to another while retaining the same mode vector h. As such, in at least one embodiment, the motion planner 108 may limit planning to one candidate per free-end homotopy class.

In at least one embodiment, when initializing the motion planner 108, the motion planner 108 may be configured to consider all possible free-end homotopy classes. However, the quantity of free-end homotopy classes may increase exponentially with the quantity of nearby objects and many of the free-end homotopy classes may not be realistic. In FIG. 4, for example, a CCW mode for the agent 420 may not be viable if there is not enough space for the vehicle 900 to pass by on the right side of the agent 420. Further, for faraway objects, the free-end homotopy class is mostly likely S due to a small angular distance within the planning horizon. Thus, the motion planner 108 may filter out one or more motion classes based at least on determining the one or more motion classes are infeasible and/or unlikely.

In at least one embodiment, to identify promising motion classes, such as free-end homotopy classes, the ego route determiner 106A samples N trajectories for the vehicle 900. The obstacle route determiner 106B provides scene-centric trajectory predictions for all M objects in the scene. As a result, there may be N×M class candidates. The motion planner 108 may categorize the class candidates into one or more motion classes. In examples where the motion classes correspond to free-end homotopy classes, the class candidates may be expressed using mode vectors, as described herein. The motion classes may include repeated mode vectors, and the motion planner 108 may select, for example, at most one trajectory for each mode vector. By way of example, and not limitation, the motion planner 108 may retain the trajectory of a motion class that has a highest reward amongst the class. For example, the motion planner 108 may only retain the trajectory with the highest reward among all trajectories sharing the same mode vector as a representative for the corresponding motion class. In further examples, a reward function may be used to select any number of trajectories per class based on relative rewards, or scores, amongst class members. In at least one embodiment, the reward, or scoring function, may be a scalar-valued function that scores the performance of the trajectory sample with respect to one or more other object trajectories.

Thus, the motion planner 108 may retain k ego trajectories out of the initial samples. Using disclosed approaches, each retained trajectory may have a unique motion and/or free-end homotopy class for the scene with respect to one or more obstacles. The k ego trajectories and corresponding obstacle trajectories (which may be the same for each ego trajectory) may be used to configure the problem space(s) evaluated using the evaluator 116. Additionally, or alternatively, disclosed approaches may enforce the motion class, such as the free-end homotopy class of the trajectory, as a constraint on the planning problem (e.g., to constrain the solution space for an initial trajectory to the motion class).

Figure 5A:
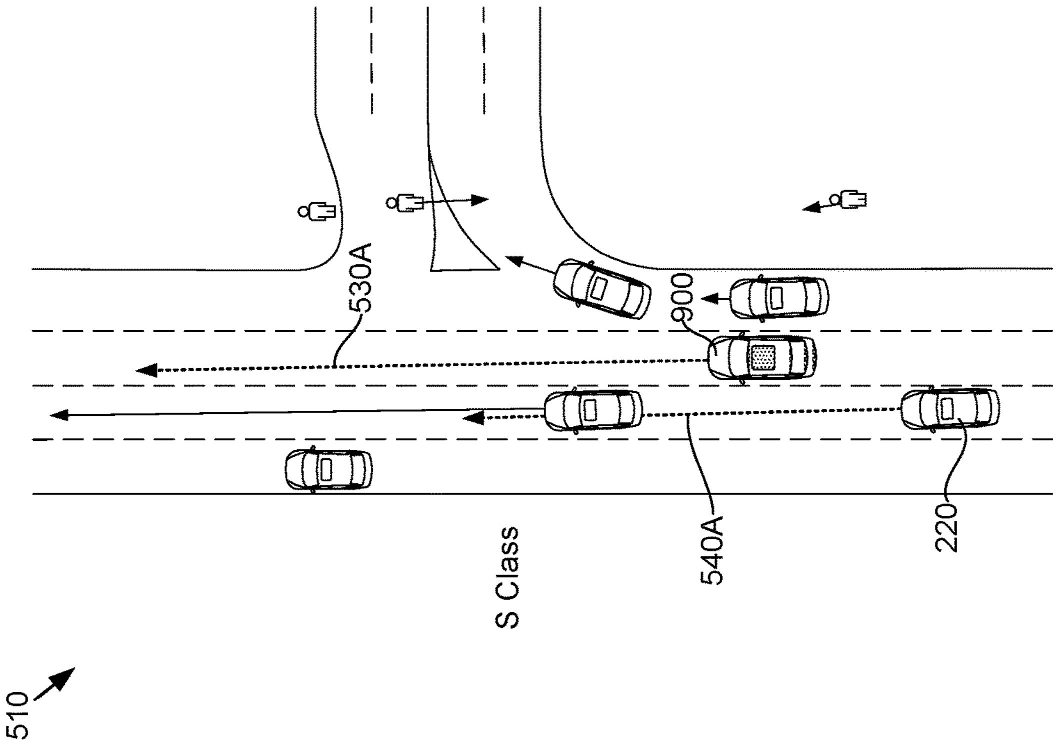
FIG. 5A illustrates an example of a scene with a trajectory that may be determined based at least on a static homotopy class, in accordance with some embodiments of the present disclosure.
Figure 5B:
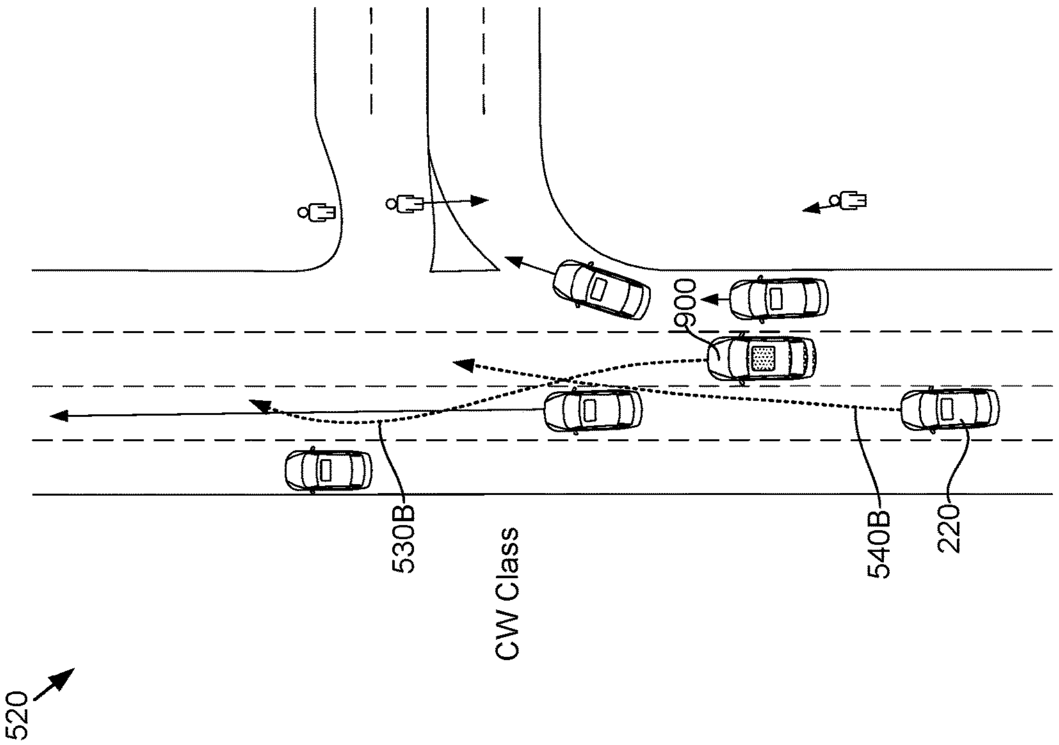
FIG. 5B illustrates an example of a scene with a trajectory that may be determined based at least on a clockwise homotopy class, in accordance with some embodiments of the present disclosure.

Referring now to FIGS. 5A and 5B, FIG. 5A illustrates an example of a scene 510 with a trajectory 530A that may be determined based at least on a static homotopy class, in accordance with some embodiments of the present disclosure and FIG. 5B illustrates an example of a scene 520 with a trajectory 530B that may be determined based at least on a clockwise homotopy class, in accordance with some embodiments of the present disclosure. The trajectories 530A and 530B may correspond to alternative solutions, which may be concurrently determined using the motion planner 108 for different ego trajectories. For example, the only difference between the two homotopy classes may be that in FIG. 5A, the homotopy with respect to the agent 220 and the obstacle trajectory 540A is static and in FIG. 5B, the homotopy with respect to the agent 220 and the obstacle trajectory 540B is clockwise. In FIG. 5A, the trajectory 530A for the vehicle 900 and the trajectory 540A for the trailing agent 220 each remain within respective lanes. However, in FIG. 5B, the trajectory 530B for the vehicle 900 includes a lane change, which relies on the trailing agent 220 changing to the right lane to avoid collision with the vehicle 900—similar to ego-conditioned prediction.

One or more portions of the updated ego and obstacle routes 120 (e.g., an ego trajectory) may be provided to the control component 112 to define the trajectory for the ego machine (e.g., iteratively as the routes are updated). The motion planner 108 may pass information indicating the updated ego and obstacle routes 120 (e.g., an ego trajectory) to the control component. The information may include one or more control operations (e.g., corresponding to a control sequence for the updated ego trajectory) used by the control component(s) 112 to determine controls for the vehicle 900 for actuating the vehicle 900 according to the control operations. One or more portions of the process 100 may be completed as needed, such as at each time step, interval, and/or for each state of the environment, or when a new motion plan or control sequence is needed or desired, such that new control operations and/or controls are generated, analyzed, and selected, and the vehicle 900 follows the corresponding control operations.

Figure 6:
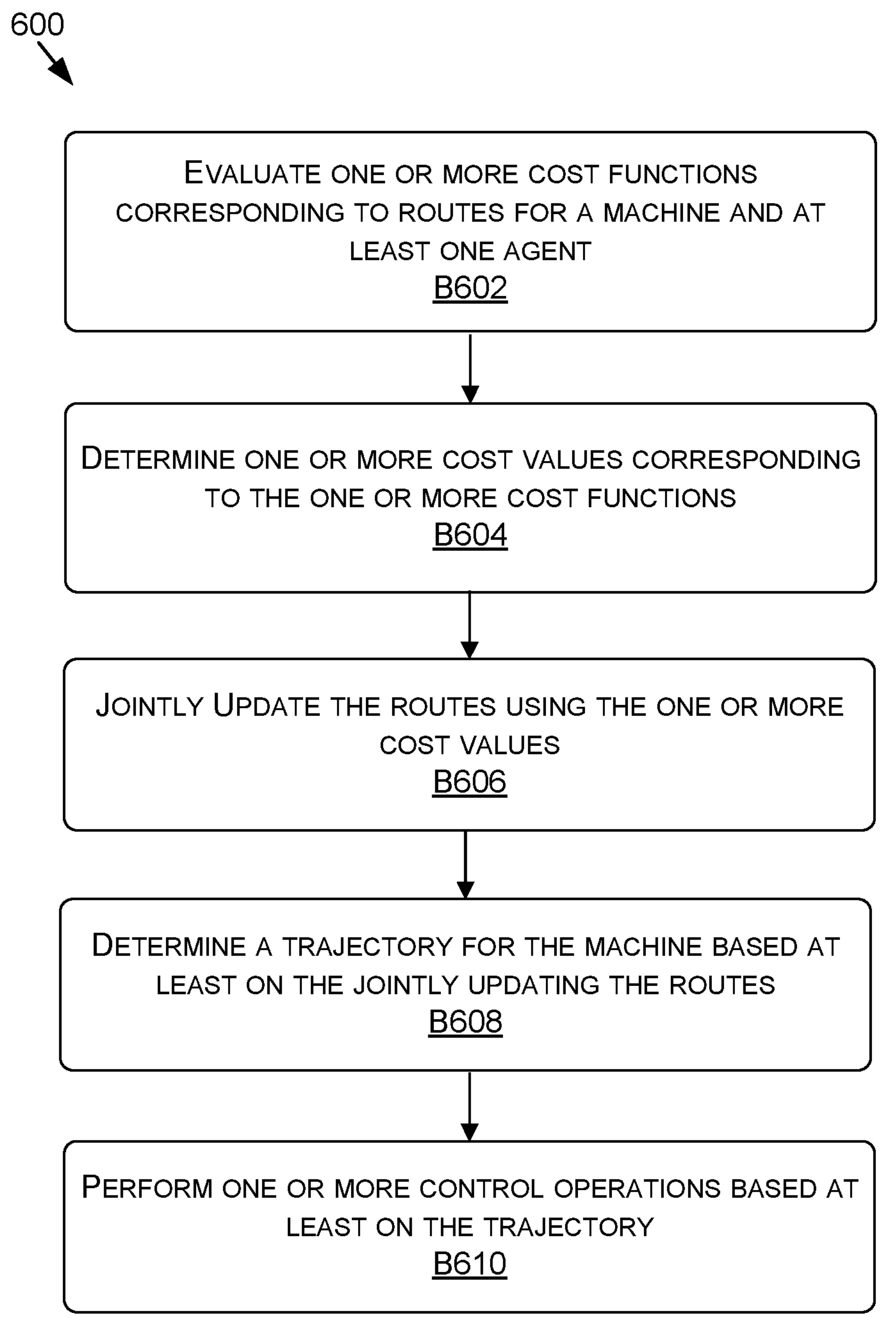
FIG. 6 is a flow diagram showing a method for jointly updating routes for a machine and at least one agent using one or more cost values, in accordance with some embodiments of the present disclosure.
Figure 7:
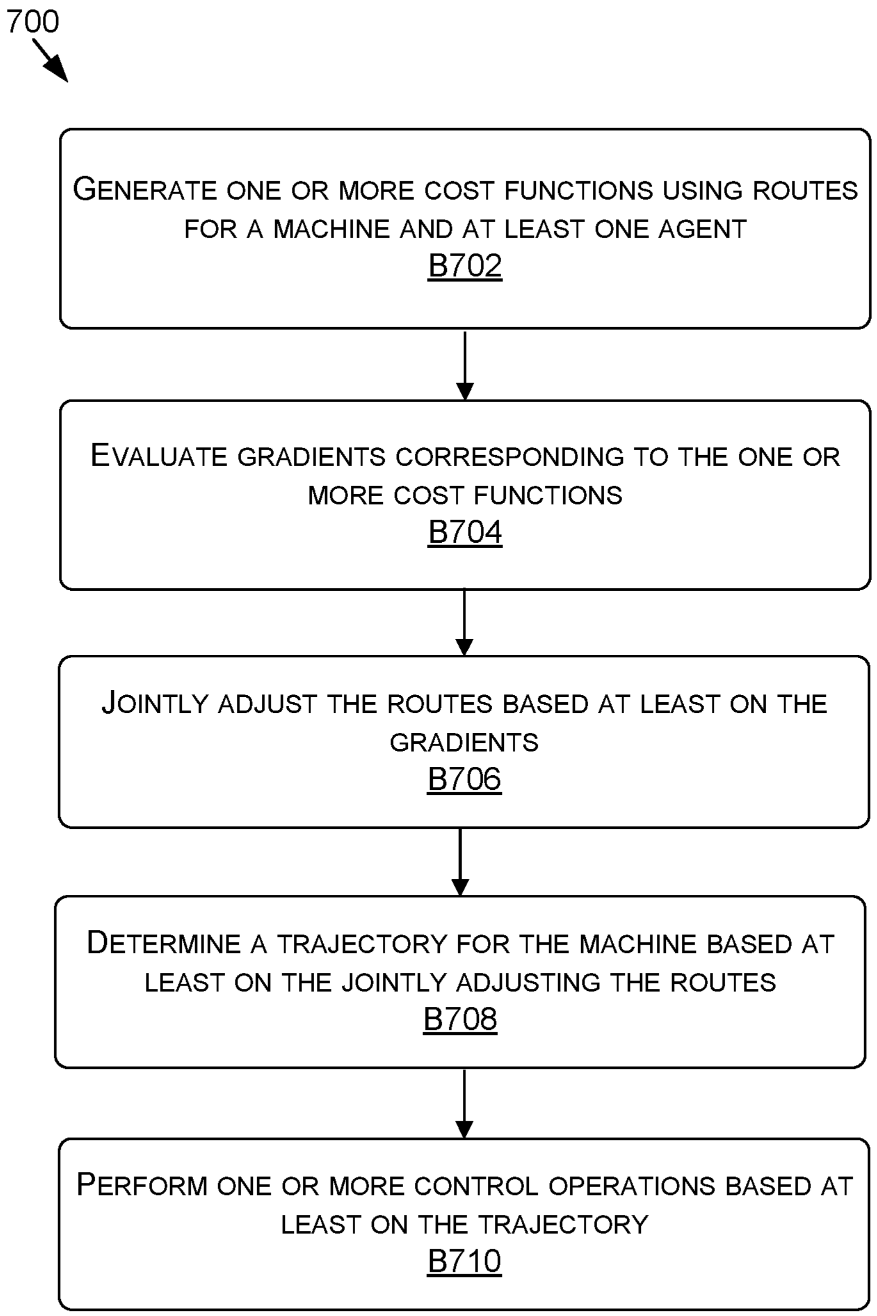
FIG. 7 is a flow diagram showing a method for jointly adjusting routes for a machine and at least one agent using gradients corresponding to one or more cost functions, in accordance with some embodiments of the present disclosure.
Figure 8:
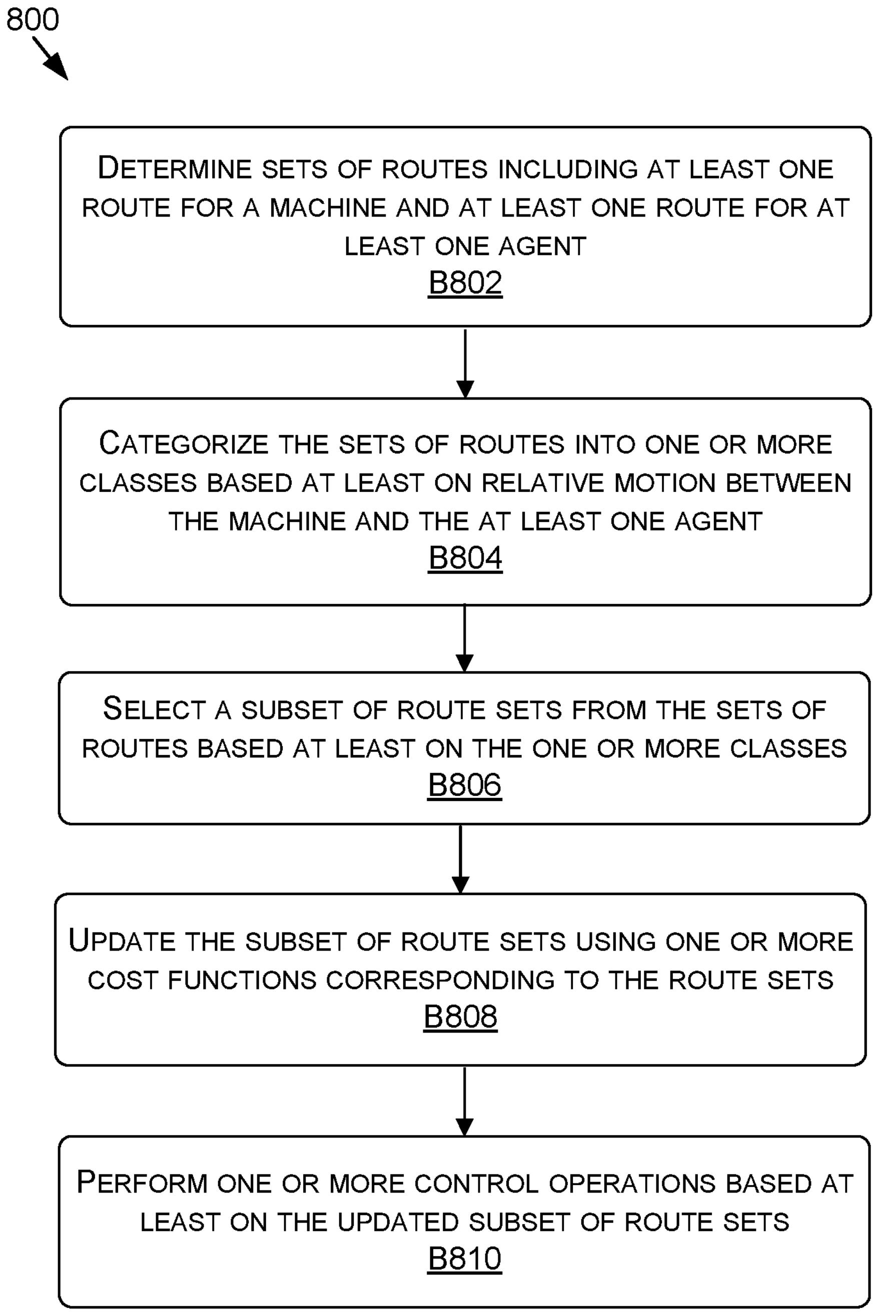
FIG. 8 is a flow diagram showing a method for updating a subset of route sets based at least on relative motion between the machine and the at least one agent, in accordance with some embodiments of the present disclosure.

Referring now to FIGS. 6, 7, and 8, each block of methods 600, 700, and 800, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to FIGS. 1-5B. However, these methods may additionally or alternatively be executed by any one system, or any combination of systems, including, but not limited to, those described herein.

Referring now to FIG. 6, FIG. 6 is a flow diagram showing a method 600 for jointly updating routes for a machine and at least one agent using one or more cost values, in accordance with some embodiments of the present disclosure. The method 600, at block B602, includes evaluating one or more cost functions for a machine and at least one agent. For example, the evaluator 116 of the motion planner 108 may evaluate, over one or more time steps, one or more cost functions corresponding to at least one first route corresponding to the vehicle 900 and at least one second route corresponding to the agent 220.

At block B604, the method 600 includes determining one or more cost values corresponding to the one or more cost functions. For example, the evaluator 116 may, based at least on the evaluating, determine one or more cost values corresponding to the one or more cost functions.

At block B606, the method 600 includes jointly updating the routes using the one or more cost values. For example, the updater 118 may jointly update, over the one or more time steps and using the one or more cost values, the at least one first route corresponding to the vehicle 900 and the at least one second route corresponding to the agent 220.

At block B608, the method 600 includes determining a trajectory for the machine based at least on the jointly updating the routes. For example, the motion planner 108 may determine the route 240 for the vehicle 900 based at least on the jointly updating of the at least one first route and the at least one second route (e.g., using the update ego and obstacle routes 120).

At block B610, the method 600 includes performing one or more control operations based at least on the trajectory. For example, the control component 112 may one or more control operations for the vehicle 900 using the trajectory.

Referring now to FIG. 7, FIG. 7 is a flow diagram showing a method 700 for jointly adjusting routes for a machine and at least one agent using gradients corresponding to one or more cost functions, in accordance with some embodiments of the present disclosure. The method 700, at block B702, includes generating one or more cost functions using routes for a machine and at least one agent. For example, the motion planner 108 may generate one or more cost functions using at least one first route corresponding to the vehicle 900 and at least one second route corresponding to the agent 220.

At block B704, the method 700 includes evaluating gradients corresponding to the one or more cost functions. For example, the updater 118 may evaluate, over a plurality of time steps, gradients corresponding to the one or more cost functions.

At block B706, the method 700 includes jointly adjusting the routes based at least on the gradients. For example, the updater 118 may based at least on the gradients, jointly adjust the at least one first route corresponding to the vehicle 900 and the at least one second route corresponding to the agent 220.

At block B708, the method 700 includes determining a trajectory for the machine based at least on the jointly adjusting the routes. For example, the motion planner 108 may determine the route 240 for the vehicle 900 based at least on the jointly the at least one first route and the at least one second route (e.g., using the update ego and obstacle routes 120).

At block B710, the method 700 includes performing one or more control operations based at least on the trajectory. For example, the control component 112 may one or more control operations for the vehicle 900 using the trajectory.

Referring now to FIG. 8. FIG. 8 is a flow diagram showing a method 800 for updating a subset of route sets based at least on relative motion between the machine and the at least one agent, in accordance with some embodiments of the present disclosure. The method 800, at block B802, includes determining sets of routes including at least one routes for a machine and at least one route for at least one agent. For example, the route determiner 106 may determine sets of routes and each set may include a route for the machine and at least one route for the agent 220.

At block B804, the method 800 includes categorizing the sets of routes into one or more classes based at least on relative motion between the machine and the at least one agent. For example, the motion planner 108 may categorize the sets of routes into one or more classes (e.g., free-end homotopy classes) based at least on relative motion between the vehicle 900 and the agent 220.

At block B806, the method 800 includes selecting a subset of routes from the sets of routes based at least on the one or more classes. For example, the motion planner 108 may the select a subset of routes from the sets of routes based at least on the one or more classes (select one set of routes per-free-end homotopy class).

At block B808, the method 800 includes updating the subset of route sets using one or more cost functions corresponding to the route sets. For example, the evaluator 116 and the updater 118 may update the subset of route sets using one or more cost functions corresponding to the route sets.

At block B810, the method 800 includes performing one or more control operations based at least on the updated subset of route sets. For example, the control component 112 may one or more control operations for the vehicle 900 using the updated subset of route sets.

EXAMPLE EMBODIMENTS

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes one or more processing units to perform operations including: evaluating, over one or more time steps, one or more cost functions corresponding to at least one first route corresponding to a machine and at least one second route corresponding to at least one agent; based at least on the evaluating, determining one or more cost values corresponding to the one or more cost functions; jointly updating, over the one or more time steps and using the one or more cost values, the at least one first route corresponding to the machine and the at least one second route corresponding to the at least one agent; determining a trajectory for the machine based at least on the jointly updating of the at least one first route and the at least one second route; and performing one or more control operations for the machine using the trajectory. Other embodiments of this aspect include corresponding computer systems, apparatus, and computer programs recorded on one or more computer storage devices, each configured to perform the actions of the methods.

Implementations may include one or more of the following features. The system where the one or more cost functions include one or more terms that penalize deviation from the at least one second route corresponding to the at least one agent. The one or more cost functions include one or more terms that penalize one or more of acceleration or jerk for the at least one agent. The jointly updating the at least one first route and the at least one second route is based at least on computing, using the one or more cost values, a gradient of the one or more cost functions. The jointly updating includes updating the at least one first route and the at least one second route over a plurality of iterations, and the determining the trajectory includes determining a first portion of the trajectory in a first iteration of the plurality of iterations and a second portion of the trajectory in a second iteration of the plurality of iterations. The operations further include: categorizing sets of routes for the machine and the at least one agent into a homotopy class based at least on the sets including trajectories for the machine that have a same initial point and a different end point; and selecting a subset of the sets of the routes for the evaluating, where the at least one first route and the at least one second route are included in the subset. The operations further include: categorizing sets of routes for the machine and the at least one agent based at least on angular distances between the machine and the at least one agent to determine categorized sets of the routes; and selecting a subset of the sets of the routes for the evaluating, where the at least one first route and the at least one second route are included in the subset. The operations further include predicting, using one or more machine learning models and sensor data obtained using one or more sensors associated with the machine, the at least one first route and the at least one second route. The jointly updating the at least one first route corresponding to the machine and the at least one second route corresponding to the at least one agent includes a gradient-based optimization of the one or more cost functions. The system is may include in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3d assets; a system for performing deep learning operations; a system implemented using an edge device; a system implemented using a robot; a system for performing conversational ai operations; a system implementing one or more language models; a system implementing one or more large language models (llms); a system for performing one or more generative ai applications; a system for generating synthetic data; a system for presenting at least one of virtual reality content, augmented reality content, or mixed reality content; a system incorporating one or more virtual machines (vms); a system implemented at least partially in a data center; or a system implemented at least partially using cloud computing resources. Implementations of the described techniques may include hardware, a method or process, or computer software on a computer-accessible medium.

One general aspect includes. The method also includes generating one or more cost functions using at least one first route corresponding to a machine and at least one second route corresponding to at least one agent; evaluating, over a plurality of time steps, gradients corresponding to the one or more cost functions; based at least on the gradients, jointly adjusting the at least one first route corresponding to the machine and the at least one second route corresponding to the at least one agent; determining a path for the machine based at least on the jointly adjusting the at least one first route and the at least one second route; and performing one or more control operations for the machine using the path. Other embodiments of this aspect include corresponding computer systems, apparatus, and computer programs recorded on one or more computer storage devices, each configured to perform the actions of the methods.

Implementations may include one or more of the following features. The method where the one or more cost functions include one or more terms that penalize one or more of deviation from the at least one second route corresponding to the at least one agent, acceleration for the at least one agent, or jerk for the at least one agent. The at least one first route and the at least one second route are included in the subset. The at least one first route and the at least one second route are included in the subset. The evaluating includes: evaluating, using the one or more cost functions, a first version of the at least one first route and a first version of the at least one second route to determine a second version of the at least one first route and a second version of the at least one second route; and evaluating, using the one or more cost functions, the second version of the at least one first route and the second version of the at least one second route to determine a third version of the at least one first route and a third version of the at least one second route, where the path is based at least on the third version of the at least one first route. Implementations of the described techniques may include hardware, a method or process, or computer software on a computer-accessible medium.

One general aspect includes. The processor also includes one or more circuits to perform one or more control operations for a machine using a trajectory, the trajectory determined based at least on evaluating one or more cost functions corresponding to at least one first route corresponding to the machine and at least one second route corresponding to at least one agent to jointly adjust the at least one first route corresponding to the machine and the at least one second route corresponding to the at least one agent. Other embodiments of this aspect include corresponding computer systems, apparatus, and computer programs recorded on one or more computer storage devices, each configured to perform the actions of the methods.

Implementations may include one or more of the following features. The processor where the one or more cost functions include one or more terms that penalize one or more of deviation from the at least one second route corresponding to the at least one agent, acceleration for the at least one agent, or jerk for the at least one agent. The trajectory is further determined based at least on: categorizing sets of routes for the machine and the at least one agent into a homotopy class based at least on the sets including trajectories for the machine that have a same initial point and a different end point; and selecting a subset of the sets of the routes for the evaluating, where the at least one first route and the at least one second route are included in the subset.

The trajectory is further determined based at least on: categorizing sets of routes for the machine and the at least one agent based at least on angular distances between the machine and the at least one agent to determine categorized sets of the routes; and selecting a subset of the sets of the routes for the evaluating, where the at least one first route and the at least one second route are included in the subset. Implementations of the described techniques may include hardware, a method or process, or computer software on a computer-accessible medium.

Example Autonomous Vehicle

Figure 9A:
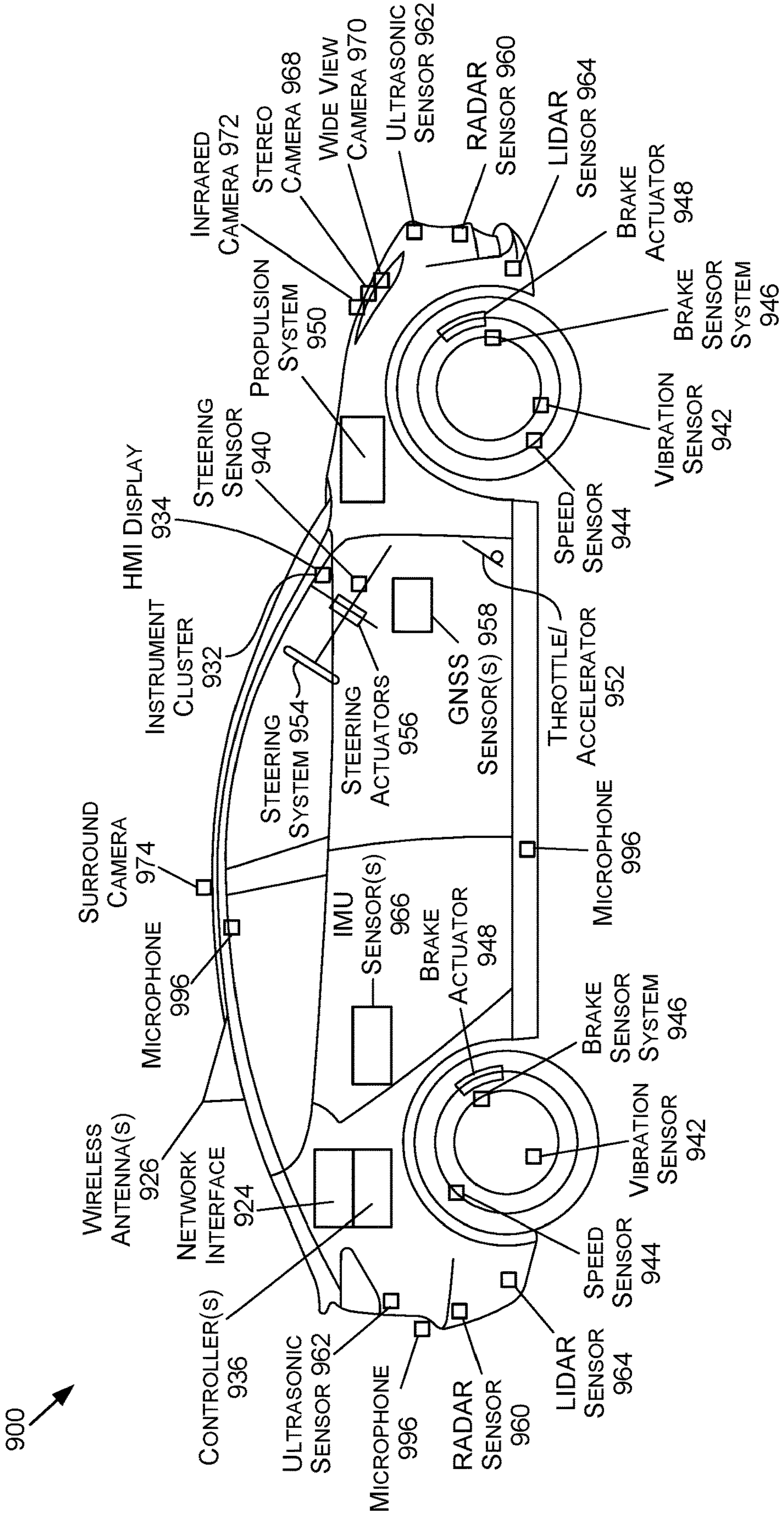
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer (s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor (s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
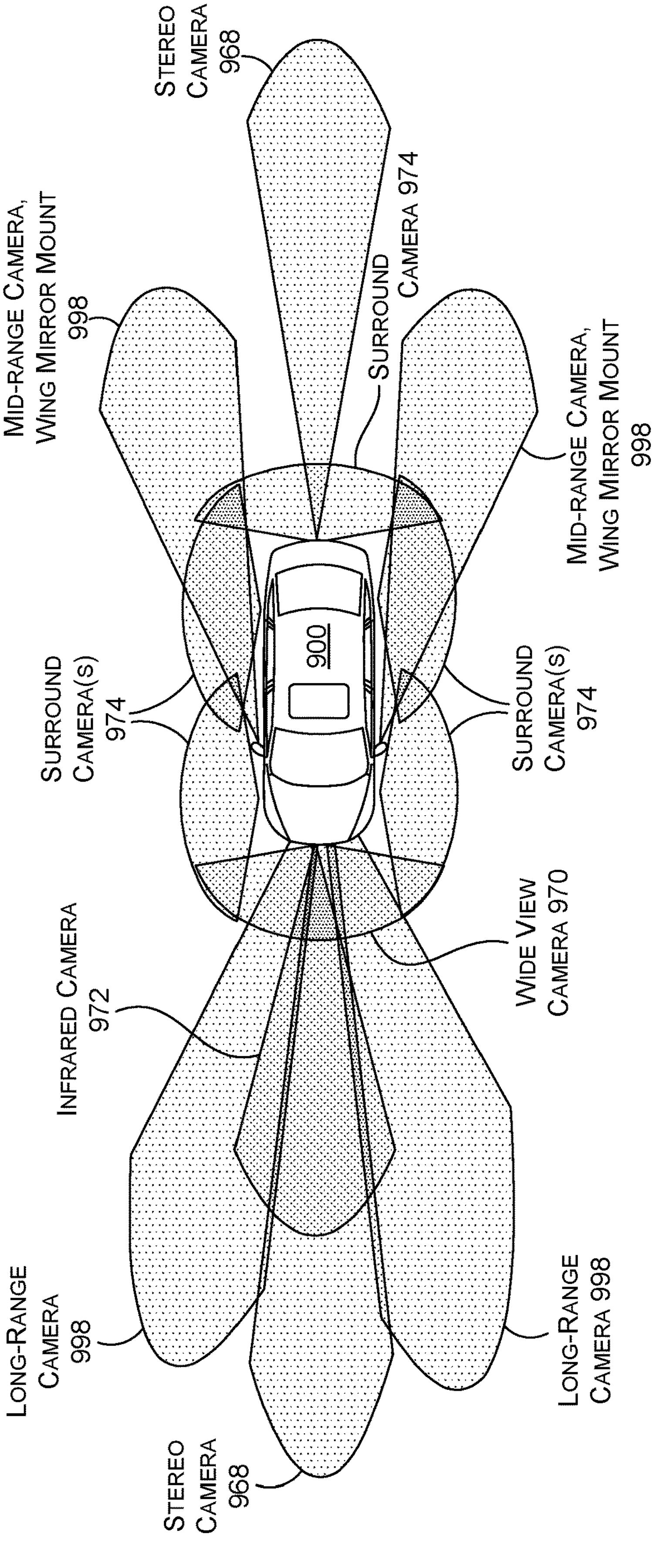
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
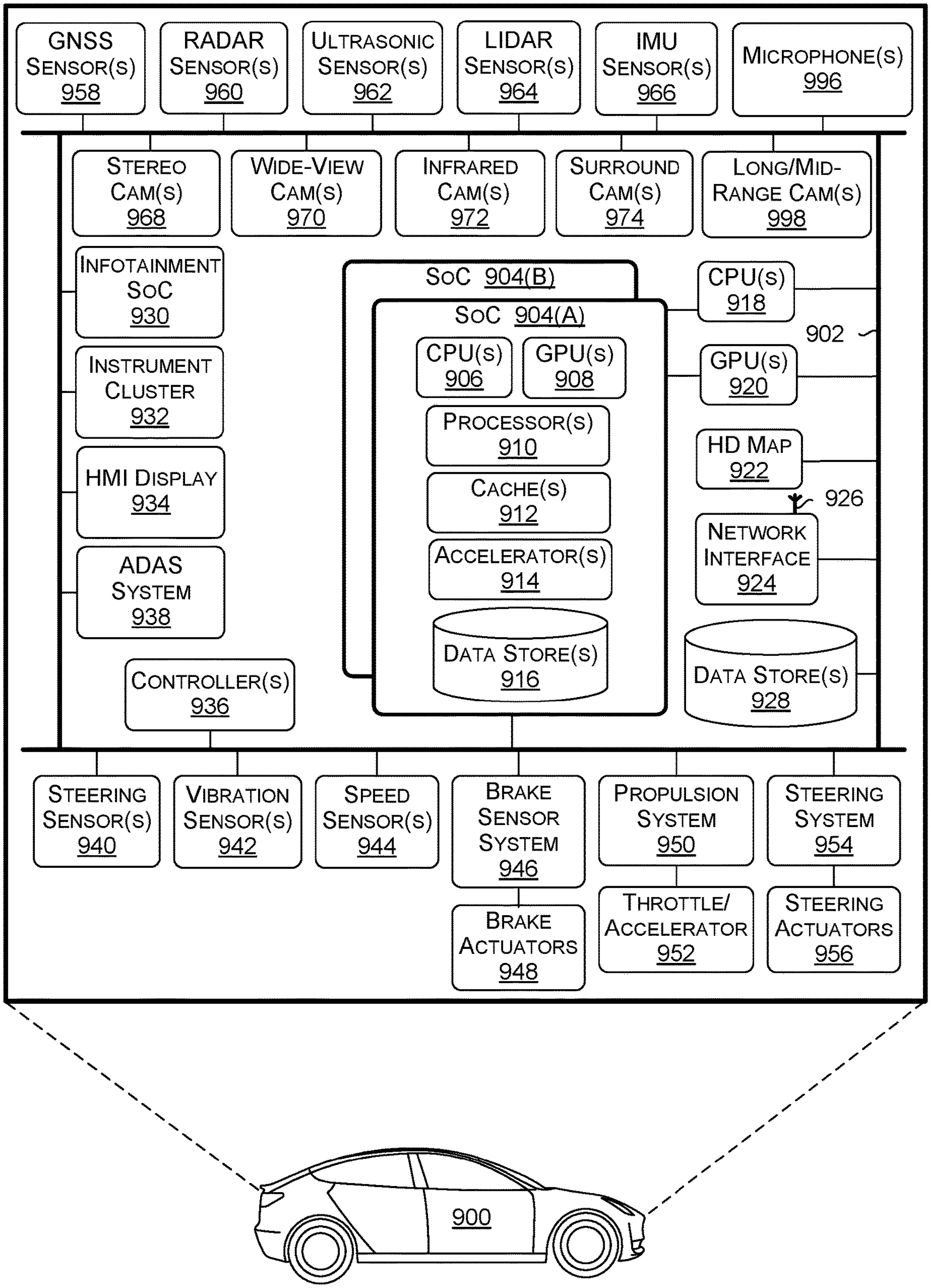
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 904 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906.

The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5*m*, 4*m*). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 900), while the 12V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
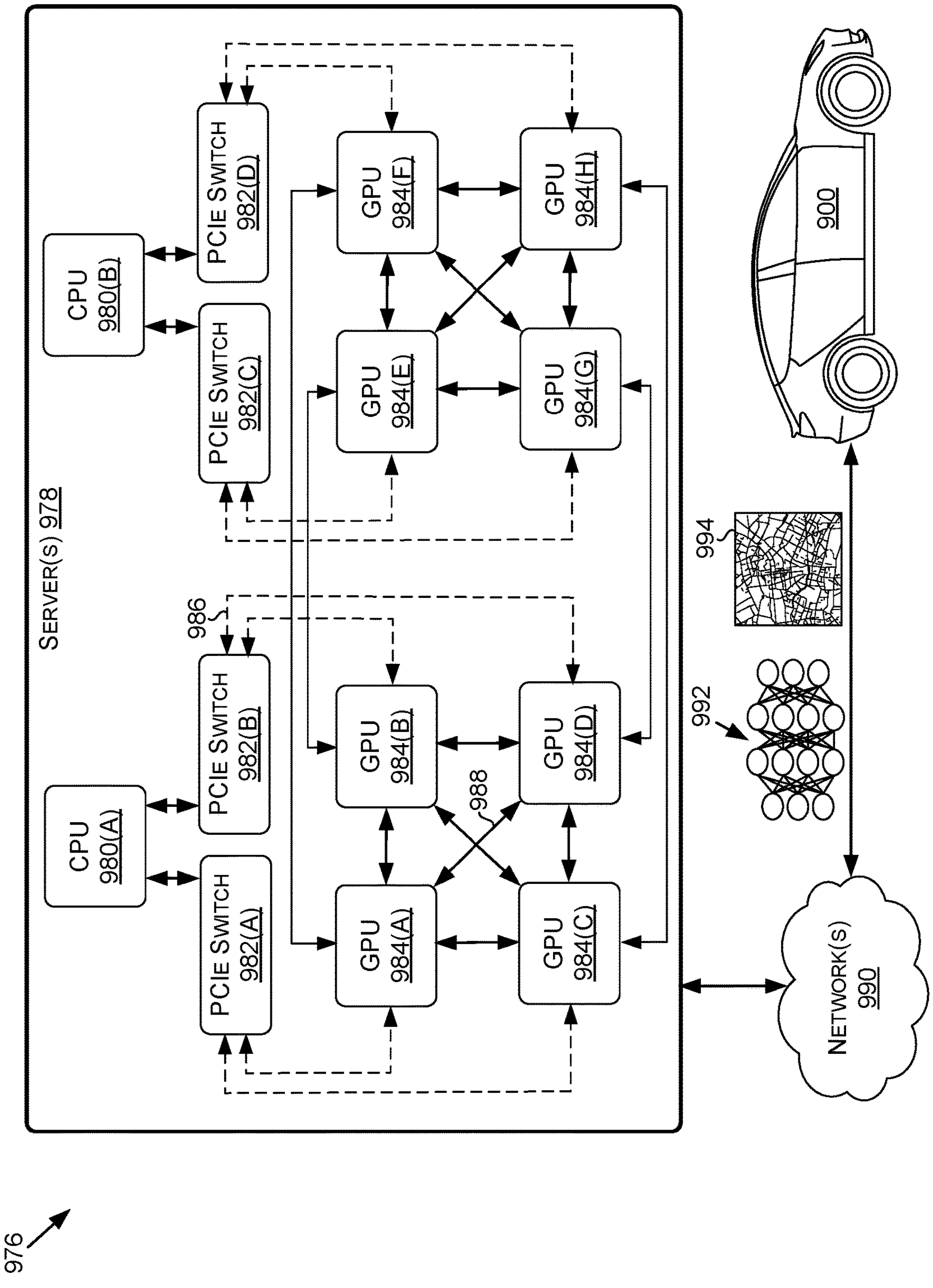
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984 (H) (collectively referred to herein as GPUs 984), PCIe switches 982(A)-982 (D) (collectively referred to herein as PCIe switches 982), and/or CPUs 980(A)-980 (B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
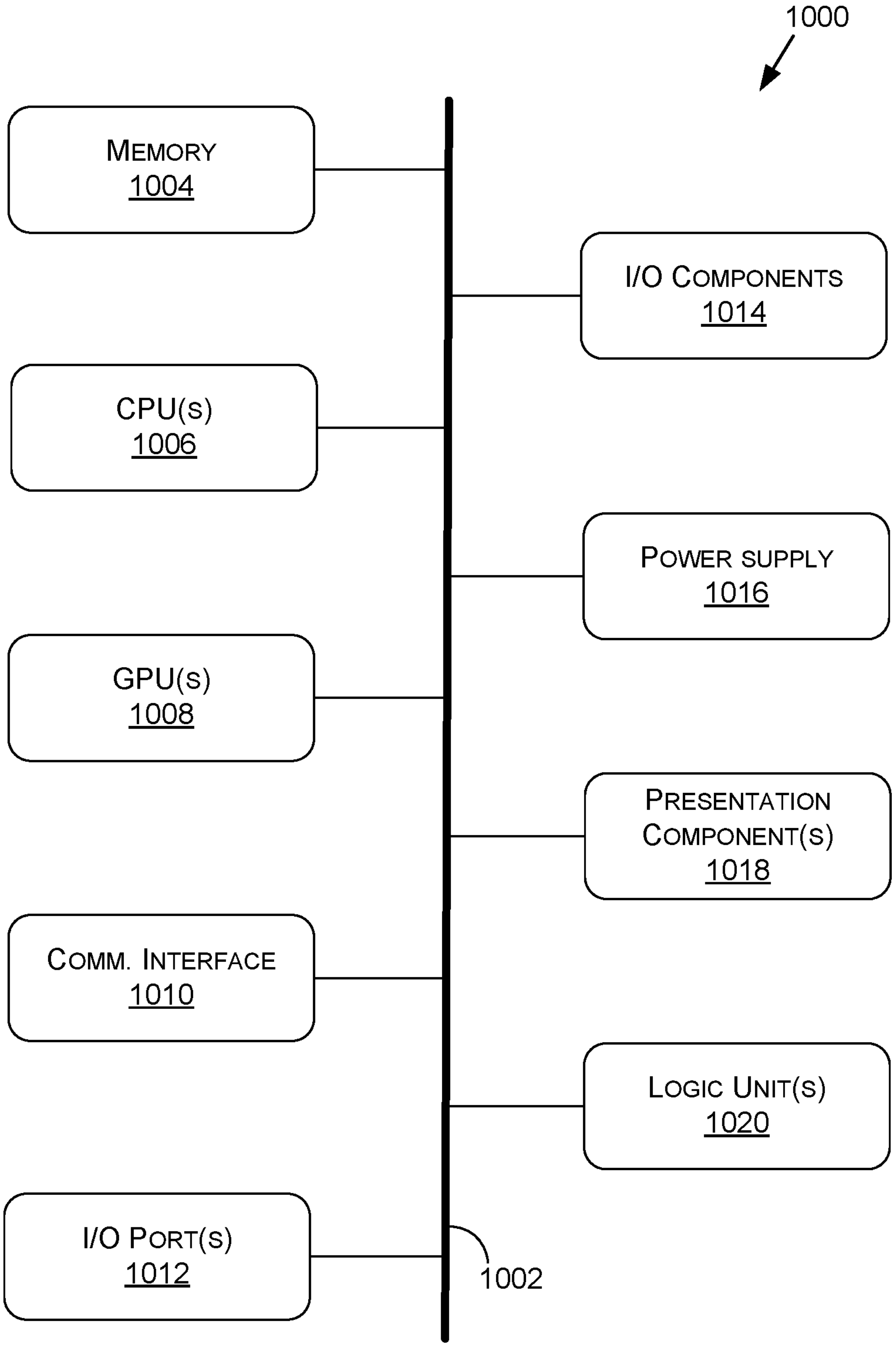
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology. CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
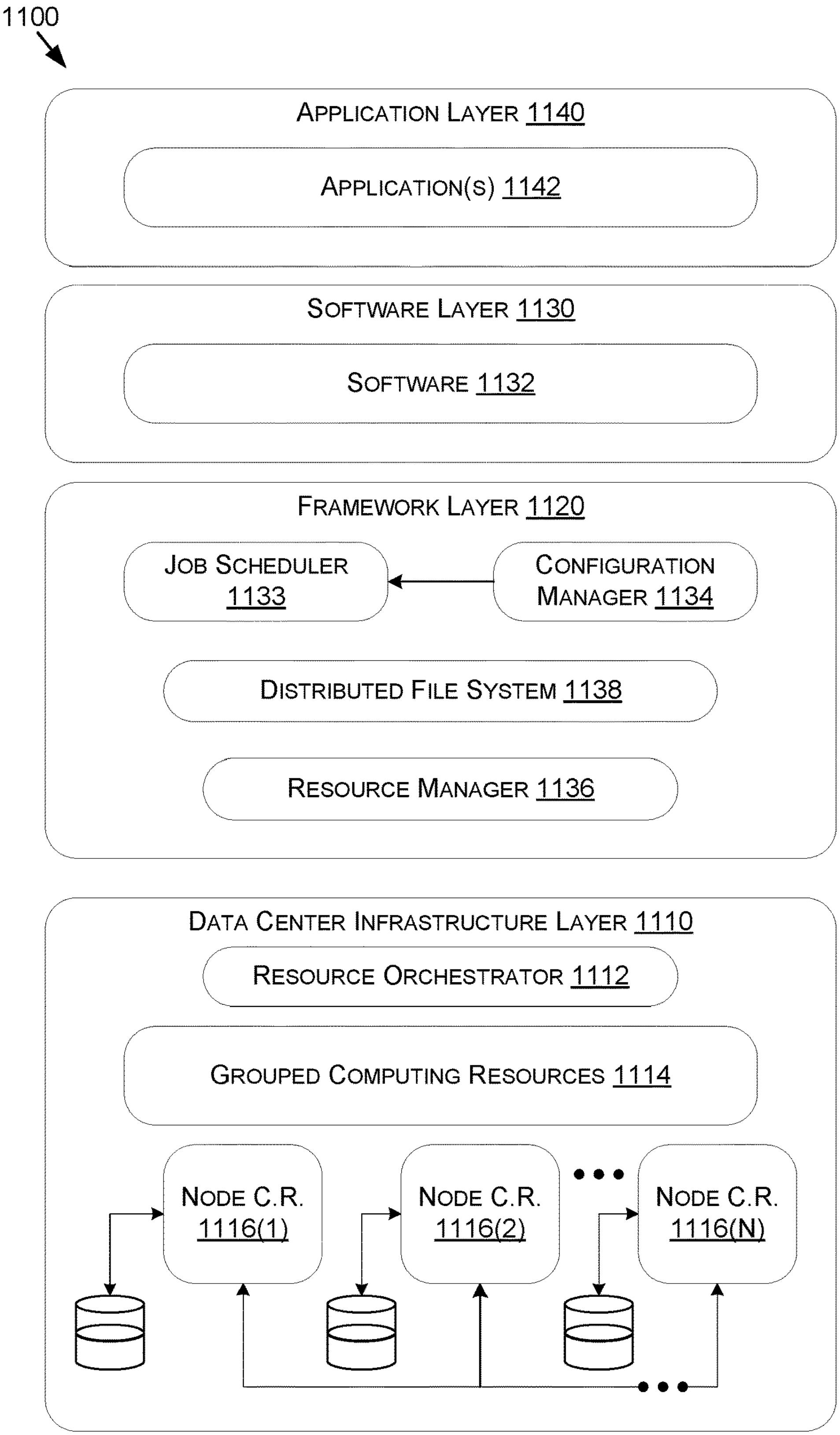
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application (s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116 (N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to perform operations including:

evaluating, over one or more time steps, a cost function that combines one or more first costs corresponding to at least one first route corresponding to a machine with one or more second costs corresponding to at least one second route corresponding to at least one agent to form one or more cost values corresponding to the cost function;

jointly updating, over the one or more time steps and using the one or more cost values, the at least one first route to at least one updated first route and the at least one second route to at least one updated second route that corresponds to a predicted reaction to the at least one updated first route based at least on determining, using a gradient of the cost function, that the at least one updated first route and the at least one updated second route reduce the cost function;

determining a trajectory for the machine based at least on the jointly updating; and performing one or more control operations for the machine using the trajectory.

2. The system of claim 1, wherein the cost function includes one or more terms that penalize the at least one updated second route based at least on an amount of deviation of the at least one updated second route from the at least one second route corresponding to the at least one agent.

3. The system of claim 1, wherein the cost function includes one or more terms that penalize one or more of acceleration or jerk for the at least one updated second route of the at least one agent.

4. The system of claim 1, wherein the cost function includes one or more variables that alter a relative distribution of emphasis in the cost function between the machine and the at least one agent.

5. The system of claim 1, wherein the jointly updating includes updating the at least one first route and the at least one second route over a plurality of iterations, and the determining the trajectory includes determining a first portion of the trajectory in a first iteration of the plurality of iterations and a second portion of the trajectory in a second iteration of the plurality of iterations.

6. The system of claim 1, wherein the operations further include:

categorizing sets of routes for the machine and the at least one agent into a homotopy class based at least on the sets including trajectories for the machine that have a same initial point and a different end point; and selecting a subset of the sets of the routes for the evaluating, wherein the at least one first route and the at least one second route are included in the subset and the jointly updating constrains the at least one updated second route and the at least one updated first route to the homotopy class.

7. The system of claim 1, wherein the operations further include:

categorizing sets of routes for the machine and the at least one agent based at least on angular distances between the machine and the at least one agent to determine categorized sets of the routes; and selecting a subset of the sets of the routes for the evaluating, wherein the at least one first route and the at least one second route are included in the subset.

8. The system of claim 1, wherein jointly updating constrains the at least one updated first route and the at least one updated second route to a motion class selected for a motion plan, the motion class characterizing a relative motion between the machine and the at least one agent.

9. The system of claim 1, wherein the at least one second route includes an initial route that represents a trajectory prediction for the at least one agent that is unconditioned on the machine, and the cost function includes one or more terms that penalize the at least one updated second route based at least on an amount of deviation of the at least one updated second route from the initial route.

10. The system of claim 1, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system implementing one or more language models;

a system implementing one or more large language models (LLMs);
a system for performing one or more generative AI applications;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

11. A method comprising:
evaluating, over a plurality of time steps, gradients corresponding to a cost function that combines one or more first costs corresponding to at least one first route corresponding to a machine with one or more second costs corresponding to at least one second route corresponding to at least one agent;
adjusting the at least one first route to at least one updated first route and the at least one second route to at least one updated second route that corresponds to a predicted reaction to the at least one updated first route based at least on determining, using the gradients, that the at least one updated first route and the at least one updated second route reduce the cost function;
determining a path for the machine based at least on the adjusting; and
performing one or more control operations for the machine using the path.

12. The method of claim 11, wherein the cost function includes one or more terms that penalize one or more of deviation from the at least one second route corresponding to the at least one agent, acceleration for the at least one agent, or jerk for the at least one agent.

13. The method of claim 11, further comprising:
categorizing sets of routes for the machine and the at least one agent into a homotopy class based at least on the sets including trajectories for the machine that have a same initial point and a different end point; and
selecting a subset of the sets of the routes for the evaluating, wherein the at least one first route and the at least one second route are included in the subset.

14. The method of claim 11, further comprising:
categorizing sets of routes for the machine and the at least one agent based at least on angular distances between the machine and the at least one agent to determine categorized sets of the routes; and
selecting a subset of the sets of the routes for the evaluating, wherein the at least one first route and the at least one second route are included in the subset.

15. The method of claim 11, wherein the evaluating includes:
evaluating, using the cost function, a first version of the at least one first route and a first version of the at least one second route to determine a second version of the at least one first route and a second version of the at least one second route; and
evaluating, using the cost function, the second version of the at least one first route and the second version of the at least one second route to determine a third version of the at least one first route and a third version of the at least one second route, wherein the path is based at least on the third version of the at least one first route.

16. A system comprising:
one or more circuits to perform operations including:
performing one or more control operations for a machine using a trajectory, the trajectory determined based at least on:
adjusting, using a cost function that combines one or more first costs corresponding to at least one first route corresponding to the machine with one or more second costs corresponding to at least one second route corresponding to at least one agent, the at least one first route to at least one updated first route and the at least one second route to at least one updated second route that corresponds to a predicted reaction to the at least one updated first route,
the adjusting being based at least on determining, using a gradient of the cost function, that the at least one updated first route and the at least one updated second route reduce the cost function.

17. The system of claim 16, wherein the cost function includes one or more terms that penalize one or more of deviation from the at least one second route corresponding to the at least one agent, acceleration for the at least one agent, or jerk for the at least one agent.

18. The system of claim 16, wherein the trajectory is further determined based at least on:
categorizing sets of routes for the machine and the at least one agent into a homotopy class based at least on the sets including trajectories for the machine that have a same initial point and a different end point; and
selecting a subset of the sets of the routes for the adjusting, wherein the at least one first route and the at least one second route are included in the subset.

19. The system of claim 16, wherein the trajectory is further determined based at least on:
categorizing sets of routes for the machine and the at least one agent based at least on angular distances between the machine and the at least one agent to determine categorized sets of the routes; and
selecting a subset of the sets of the routes for the adjusting, wherein the at least one first route and the at least one second route are included in the subset.

20. The system of claim 16, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system implementing one or more language models;
a system implementing one or more large language models (LLMs);
a system for performing one or more generative AI applications;
a system for generating synthetic data;
a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *